(12) United States Patent  
Golla et al.

(10) Patent No.: US 8,335,911 B2  
(45) Date of Patent: Dec. 18, 2012

(54) DYNAMIC ALLOCATION OF RESOURCES IN A THREADED, HETEROGENEOUS PROCESSOR

(75) Inventors: Robert T. Golla, Round Rock, TX (US); Gregory F. Grohoski, Bee Cave, TX (US)

(73) Assignee: Oracle America, Inc., Redwood City, CA (US)

(*) Notice: Subject to any disclaimer, the term of this patent is extended or adjusted under 35 U.S.C. 154(b) by 593 days.

(21) Appl. No.: 12/570,642

(22) Filed: Sep. 30, 2009

(65) Prior Publication Data

US 2010/0299499 A1   Nov. 25, 2010

Related U.S. Application Data

(63) Continuation-in-part of application No. 12/485,608, filed on Jun. 16, 2009, and a continuation-in-part of application No. 12/493,743, filed on Jun. 29, 2009, and a continuation-in-part of application No. 12/469,955, filed on May 21, 2009, now Pat. No. 8,006,075.

(51) Int. Cl.  
*G06F 9/00* (2006.01)

(52) U.S. Cl. .................................................. 712/220

(58) Field of Classification Search ................. 712/220  
See application file for complete search history.

(56) References Cited

U.S. PATENT DOCUMENTS

| | | | |
|---|---|---|---|
| 6,154,849 A | 11/2000 | Xia | |
| 6,334,177 B1 | 12/2001 | Baumgartner et al. | |
| 6,898,687 B2 | 5/2005 | Wu et al. | |
| 6,988,186 B2* | 1/2006 | Eickemeyer et al. | 712/217 |
| 7,330,988 B2 | 2/2008 | Golla et al. | |
| 2008/0163230 A1* | 7/2008 | Latorre et al. | 718/104 |

* cited by examiner

*Primary Examiner* — Eddie P Chan  
*Assistant Examiner* — Benjamin Geib  
(74) *Attorney, Agent, or Firm* — Rory D. Rankin; Meyertons, Hood, Kivlin, Kowert & Goetzel, P.C.

(57) ABSTRACT

Systems and methods for efficient dynamic utilization of shared resources in a processor. A processor comprises a front end pipeline, an execution pipeline, and a commit pipeline, wherein each pipeline comprises a shared resource with entries configured to be allocated for use in each clock cycle by each of a plurality of threads supported by the processor. To avoid starvation of any active thread, the processor further comprises circuitry configured to ensure each active thread is able to allocate at least a predetermined quota of entries of each shared resource. Each pipe stage of a total pipeline for the processor may include at least one dynamically allocated shared resource configured not to starve any active thread. Dynamic allocation of shared resources between a plurality of threads may yield higher performance over static allocation. In addition, dynamic allocation may require relatively little overhead for activation/deactivation of threads.

17 Claims, 13 Drawing Sheets

Logical Map Table
Configuration 600

Table 610

| FIELD | DESCRIPTION |
|---|---|
| SE | Instruction produces an even single-precision floating-point (FP) result |
| SO | Instruction produces an odd single-precision FP result<br>Note: For double-precision FP results both SE and SO bits are set |
| Thread ID | Identification of the corresponding thread |
| Logical | Mapping of Logical Register Index to Physical Register |
| RV | Valid rename status |
| PQV | Valid entry status of pick queue |
| S | Assert if the instruction produces a single-precision FP result. This bit is read out of the LMT to determine if a double-precision source is dependent on a single-precision destination. |
| PQ | Entry identifier of the pick queue |

FIG. 9

Logical Map Table
Configuration 650

Table 660

| FIELD | DESCRIPTION |
|---|---|
| Thread ID | Identification of the corresponding thread |
| Logical | Mapping of Logical Register Index to Physical Register |
| RV | Valid rename status |
| PQV | Valid entry status of pick queue |
| PQ | Entry identifier of the pick queue |

*FIG. 10*

DYNAMIC ALLOCATION OF RESOURCES IN A THREADED, HETEROGENEOUS PROCESSOR

CROSS REFERENCE TO RELATED APPLICATIONS

This application claims priority to, and is a continuation-in-part of, the following applications, each of which are incorporated herein by reference in their entirety: application Ser. No. 12/485,608, filed Jun. 16, 2009, entitled "System And Method For Out-Of-Order Resource Allocation And Deallocation In A Threaded Machine"; application Ser. No. 12/493,743, filed Jun. 29, 2009, entitled "A Unified High-Frequency Out-Of-Order Pick Queue With Support For Speculative Instructions"; and application Ser. No. 12/469,955, filed May 21, 2009 now U.S. Pat. No. 8,006,075, entitled "A Dynamically Allocated Store Queue For A Multithreaded Processor."

BACKGROUND OF THE INVENTION

1. Field of the Invention

This invention relates to computing systems, and more particularly, to efficient dynamic utilization of shared resources in a processor.

2. Description of the Relevant Art

Modern microprocessors typically have increased pipeline depth in order to support higher clock frequencies and increased microarchitectural complexity. Also, out-of-order (OOO) issue and execution of instructions helps hide instruction latencies. Compiler techniques for automatic parallelization of software applications contribute to increasing instruction level parallelism (ILP). These techniques aim to increase the number of instructions executing in a processor in each clock cycle, or pipe stage. Although, these techniques attempt to increase the utilization of processor resources, many resources are unused in each pipe stage.

In addition to exploiting ILP, techniques may be used to perform two or more tasks simultaneously on a processor. A task may be a thread of a process. Two or more tasks, or threads, being simultaneously executed on a processor may correspond to the same process or different processes. This thread level parallelism (TLP) may be achieved by several techniques. One such approach is chip multiprocessing (CMP) which includes instantiating two or more processor cores, or cores, within a microprocessor.

Often, a core may be configured to simultaneously process instructions of two or more threads. A processor with multithreading enabled may be treated by the operating system as multiple logical processors instead of one physical processor. The operating system may try to share the workload among the multiple logical processors, or virtual processors. Fine-grained multithreading processors hold hardware context for two or more threads, but execute instructions from only one thread in any clock cycle. This type of processor switches to a new thread each cycle. A coarse-grained multithreading processor only switches to issue instructions for execution from another thread when the current executing thread causes a long latency events such as a page fault or a load miss to main memory. To further increase TLP, a simultaneous multithreading (SMT) processor is configured to issue multiple instructions from multiple threads per clock cycle.

SMT processors increase throughput by multiplexing shared resources among several threads. Typically, SMT processors are superscalar, out-of-order machines. The set of instructions processed in a single cycle by a particular pipe stage may not all be from the same thread. The pipeline may be shared "horizontally" as well as "vertically". Storage resources, such as the instruction queue, reorder buffer, pick queue, instruction scheduler, and store queue, for example, generally contain instructions from multiple threads simultaneously.

One aspect of SMT processor design is the division of available resources among threads. When multiple independent threads are active, assigning them to separate physical resources, or separate partitions of a shared resource which has been partitioned, can simplify the design and mitigate communication penalties. Many modern designs utilize static partitioning of storage resources, such as the instruction queue and reorder buffer. However, in static partitioning, once a given thread consumes its resources at a given stage of execution, it is forced to wait until some portion of those resources are freed before it may continue. Consequently, static partitioning may result in a reduction of realized parallelism. Additionally, while a given thread is waiting for its resources to be freed, resources dedicated for use by other threads may go unused. Consequently, static partitioning may also result in underutilization of resources.

In addition to the above, static allocation of storage resources may result in delays when switching between different thread configurations, such as switching from single-thread mode to multi-thread mode. Such delays may be due to time elapsed while allowing each of the shared resources to be deallocated as the threads complete current operations. Afterward, processor resources may be repartitioned to support a new thread configuration. These steps may take many clock cycles. If threads are assigned to and removed from a processor frequently, then the system performance may suffer.

In view of the above, efficient methods and mechanisms for efficient utilization of resources in a processor are desired.

SUMMARY OF THE INVENTION

Systems and methods for efficient dynamic utilization of shared resources in a processor are contemplated. In one embodiment, a processor comprises a front end pipeline, an execution pipeline, and a commit pipeline, wherein each pipeline comprises a shared resource with entries configured to be allocated for use in each clock cycle by each of a plurality of threads supported by the processor. To avoid starvation of any active thread, the processor further comprises circuitry configured to ensure each active thread is able to allocate at least a predetermined quota of entries of each shared resource. Each pipe stage of a total pipeline for the processor may include at least one dynamically allocated shared resource configured not to starve any active thread. Such a configuration may increase the utilization of all other resources within the processor, provide a scaleable microarchitecture, and provide peak performance for both single-thread and multi-thread modes without software mode switching. These and other embodiments will become apparent upon reference to the following description and accompanying drawings.

BRIEF DESCRIPTION OF THE DRAWINGS

FIG. 9 is a generalized block diagram illustrating an embodiment of logical map table configuration used in register renaming.

FIG. 10 is a generalized block diagram illustrating an embodiment of logical map table configuration used in register renaming.

Figure 1:
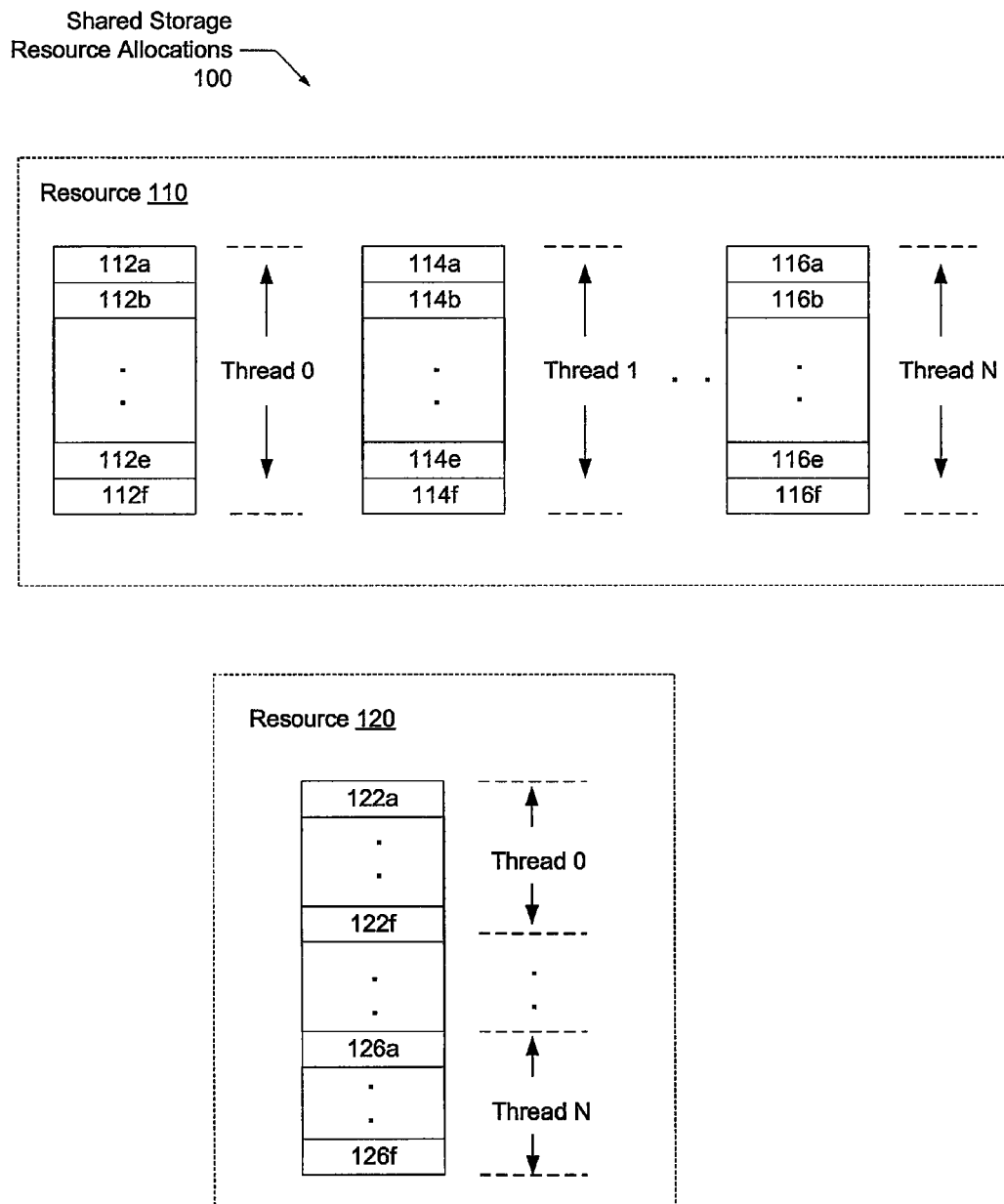
FIG. 1 is a generalized block diagram illustrating one embodiment of shared storage resource allocations.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of shared storage resource allocations 100 is shown. In one embodiment, resource 110 corresponds to a queue used for data storage on a processor core, such as a reorder buffer, a branch prediction data array, a pick queue, or other. Resource 110 may comprise a plurality of entries 112a-112f, 114a-114f, and 116a-116f. As used herein, elements referred to by a reference numeral followed by a letter may be collectively referred to by the numeral alone. For example, entries 112a-112f may be collectively referred to as entries 112. Resource 110 may be partitioned on a thread basis. For example, entries 112 may correspond to thread 0, entries 114 may correspond to thread 1, and entries 116 may correspond to thread N. In other words, each entry 112, 114, and 116 within resource 110 may be configured to be allocated for use in each clock cycle by a single predetermined thread of the N available threads. Accordingly, a corresponding processor core may be configured to process instructions of 1 to N active threads, wherein N is an integer. Although N threads are shown, in one embodiment, resource 110 may only have two threads, thread 0 and thread 1. Also, control circuitry used for allocation, deallocation, the updating of counters and pointers, and other is not shown for ease of illustration.

A queue corresponding to entries 112 may be duplicated and instantiated N times, one time for each thread in a multithreading system, such as a processor core. Each of the entries 112, 114, and 116 may be configured to store the same information. For shared storage resources, such as an instruction queue, a reorder buffer, or other, statically allocating an equal portion, or number of queue entries, to each thread may provide good performance, in part by avoiding starvation. The enforced fairness provided by this partitioning may also reduce the amount of complex circuitry used in sophisticated fetch policies, routing logic, or other.

A method of static partitioning of resources may include lower hardware overhead and less power consumption. However, scalability may be difficult. As the number N of threads grows, the consumption of on-chip real estate and power consumption may increase linearly. Also, signal line lengths greatly increase, which, due to cross-capacitance, degrade the signals being conveyed by these lines. A scaled design may also include larger buffers, more repeaters along the long lines, an increased number of storage sequential elements on the lines, a greater clock cycle time, and a greater number of pipe stages to convey values on the lines. System performance may suffer from one or a combination of these factors.

In addition, static division of issue bandwidth, such as conveying a program counter (PC) value for fetching instructions of a particular thread, issuing instructions to execution units, and committing completed instructions in a commit pipe stage may limit full resource utilization within a core. For example, a thread with the fewest instructions in the execution pipeline, such as a thread with a relatively significant lower workload than other active threads, maintains a roughly equal allocation of processor resources among active threads in the processor. It is noted resources corresponding to issue bandwidth, such as fetching, issuing, and committing instructions as mentioned above, may be reallocated every cycle, which allows these resources to avoid starving a thread over multiple cycles. However, this frequent predetermined reallocation does not adjust to the workloads of active threads in the processor. The benefits of a static allocation scheme may be reduced due to not being able to dynamically react to workloads. Therefore, system performance may decrease.

Similar to resource 110, static partitioning may be used in resource 120. However, resource 120 may not use duplicated queues, but provide static partitioning within a single queue. Here, entries 122 may correspond to thread 0 and entries 126 within a same queue may correspond to thread N. In other words, each entry 122 and 126 within resource 120 may be configured to be allocated for use in each clock cycle by a single predetermined thread of the N available threads. Each of the entries 122 and 126 may be configured to store the same information. Again, although N threads are shown, in one embodiment, resource 120 may only have two threads, thread 0 and thread 1. Also, control circuitry used for allocation, deallocation, the updating of counters and pointers, and other is not shown for ease of illustration.

The static partitioning of resource 120 may prevent starvation of any thread 0 to thread N within a multithreading system. However, the same caveats attributed to static partitioning listed above regarding scalability and limiting instruction issue bandwidth apply here as well. In one embodiment, resource 120 may be configured to reallocate any entry 122 and 126 for use in each clock cycle by each active thread of the N available threads, in response to detecting a corresponding thread to the entry 122 and/or entry 126 is inactive. For example, a thread 0 may be allocated to entries 122, a thread 1 may be allocated to a set of entries between 122 and 126, and a thread 2 may be allocated to entries 126. When thread 0 completes, another thread may not be assigned to its corresponding position. Therefore, thread 0 may now be inactive. Correspondingly, entries 122 may be associated with a free list and instructions from both thread 1 and thread 2 may be allocated to entries 122. In addition, instructions from both thread 1 and thread 2 may still be allocated to their respective original entries. Although such an embodiment may relieve some of the caveats of static partitioning, such a benefit is not realized unless one or more threads are inactive, wherein peak performance is not reached.

Figure 2:
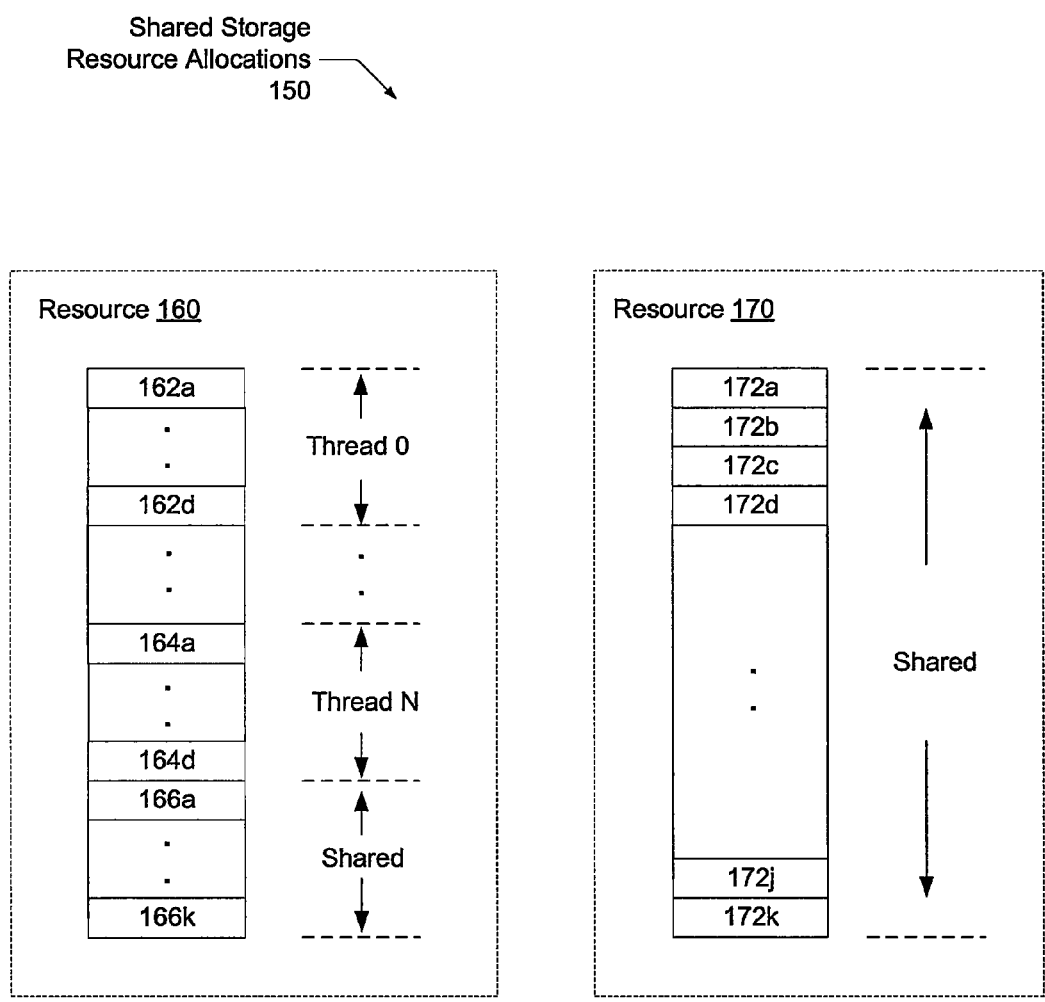
FIG. 2 is a generalized block diagram illustrating another embodiment of shared storage resource allocations.

Turning now to FIG. 2, another embodiment of shared storage resource allocations 150 is shown. In one embodiment, resource 160 corresponds to a queue used for data storage on a processor core, such as a reorder buffer, a branch prediction data array, a pick queue, or other. Similar to resource 120, resource 160 may include static partitioning of its entries within a single queue. Entries 162 may correspond to thread 0 and entries 164 may correspond to thread N. Entries 162, 164, and 166 may be configured to store the same information within a queue. Entries 166 may correspond to a dynamic allocation region within a queue. Each entry 166 may be configured to be allocated for use in each clock cycle by any of the threads in a processor core such as thread 0 to thread N.

In contrast to the above example with resource 120, dynamic allocation of a portion of resource 160 is possible with each thread being active. However, scalability may still be difficult as the number of threads N increases in a processor core design. If the number of entries 162, 164, and so forth is reduced to alleviate circuit design issues associated with a linear growth of resource 160, then performance is also reduced as the number of stored instructions per thread is reduced. Also, the limited dynamic portion offered by entries 166 may not be enough to offset the inefficiencies associated with unequal workloads among threads 0 to N, especially as N increases.

Resource 170 also may correspond to a queue used for data storage on a processor core, such as a reorder buffer, a branch prediction data array, a pick queue, or other. Unlike the previous resources 110 to 160, resource 170 does not include static partitioning. Each entry 172 may be configured to be allocated for use in each clock cycle by any thread of the N available threads in a processor core. Control circuitry used for allocation, deallocation, the updating of counters and pointers, and other is not shown for ease of illustration.

Starvation of one or more active threads is a major drawback of a design with dynamic allocation of a shared resource. However, in order to prevent starvation, the control circuitry for resource 170 may be configured to allow each active thread of the N available threads to allocate at least a predetermined quota of entries within resource 170. This logic may prevent starvation of a first thread when a second thread begins to allocate a majority of the entries 172 within resource 170. For example, the control circuitry may prevent a given active thread from allocating further entries 172 of resource 170, in response to determining a number of entries allocated by the given thread is greater than a predetermined high watermark value. In another example, in response to detecting a predetermined long latency event corresponding to a given thread such as a cache miss, the control circuitry may deallocate each entry 172 allocated to the given thread. Circuitry may also be configured to detect other types of long latency events as desired.

Figure 3:
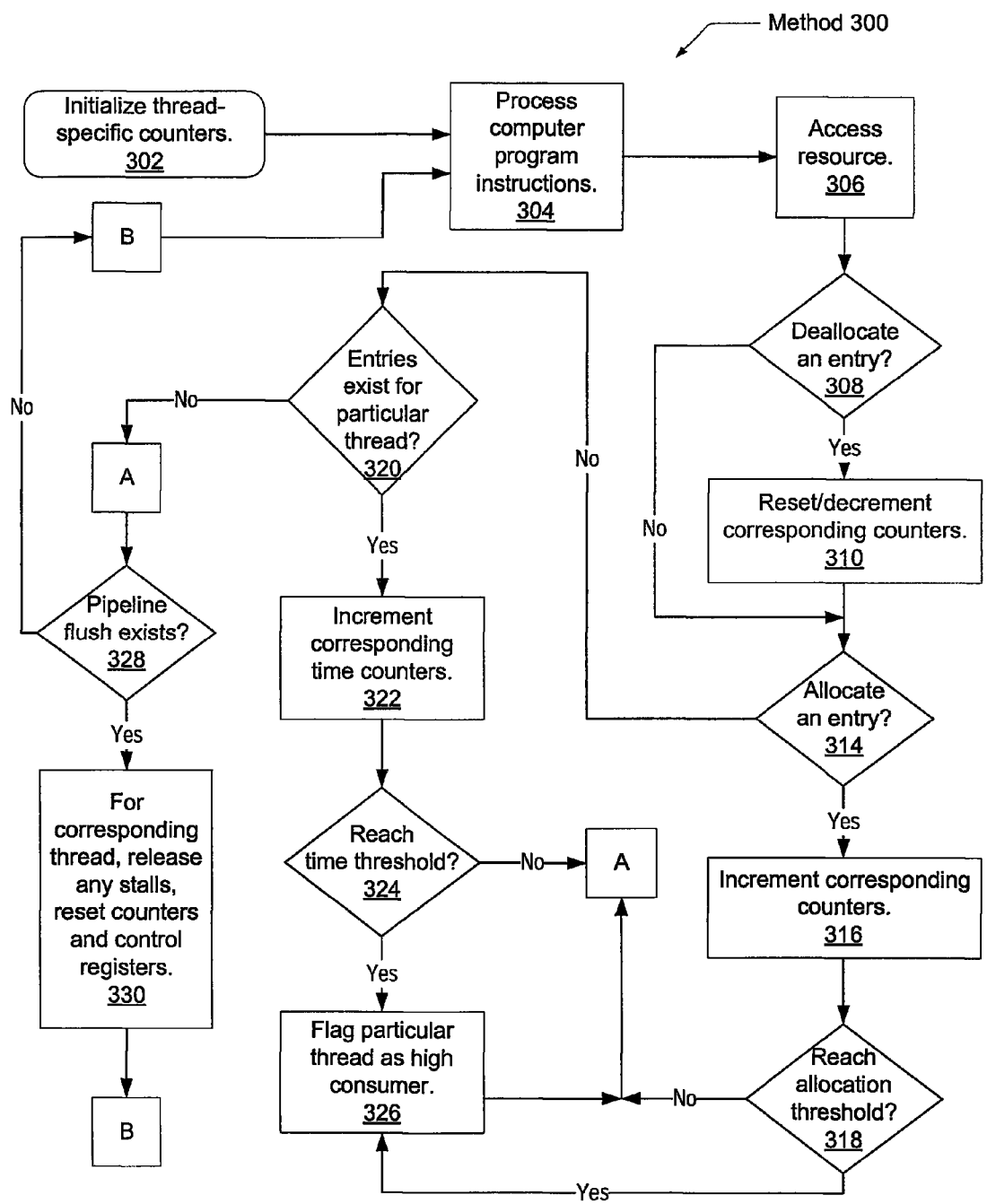
FIG. 3 is a generalized flow diagram of one embodiment of a method for efficient shared resource utilization in a processor.

Referring now to FIG. 3, one embodiment of a method 300 for efficient shared resource utilization in a processor is shown. For purposes of discussion, the steps in this embodiment are shown in sequential order. However, some steps may occur in a different order than shown, some steps may be performed concurrently, some steps may be combined with other steps, and some steps may be absent in another embodiment.

In one embodiment, a processor core may initialize counters, pointers, and tag values in block 302. These values may correspond to storage resources within the core. Additional register values, such as shift registers for branch prediction logic or other history information may be reset in block 302. In block 304, the processor core may be executing instructions of one or more software applications. These instructions may correspond to one or more threads. Generally, instructions may be fetched, decoded, renamed, issued, executed, and committed. In one embodiment, the instructions may correspond to a plurality of threads. One or more threads may be simultaneously active within the core.

In one embodiment, during the processing of these instructions of multi-threaded applications, in block 306, the processor core may access a unified shared storage resource. Each entry of this shared storage resource may be configured to be allocated in each clock cycle by each thread of an available N threads supported by the processor core. For a particular thread, if one or more entries of the shared resource are deallocated (conditional block 308), then in block 310, corresponding counters may be updated. For example, a number of allocated entries register may be decremented by a value equal to the number of entries deallocated from the shared resource in the current pipe stage. Also, an idle thread counter, which measures an amount of time a thread occupies the shared resource with no processing, may be reset. Further, if the number of allocated entries register is less than a predetermined threshold value, then a stall on the particular thread preventing further allocation of entries may be removed. A corresponding flag register may be reset. In one embodiment, the number of entries deallocated in a pipe stage may include the total number of entries in the dynamically allocated shared resource.

If one or more entries are allocated (conditional block 314), then in block 316, corresponding counters may be updated. For example, a number of allocated entries register may be incremented by a value equal to the number of entries allocated in the shared resource in the current pipe stage. Also, an idle thread counter, which measures an amount of time a thread occupies the shared resource with no processing, may be reset. In one embodiment, each unallocated entry of the dynamically allocated shared resource may be a candidate for allocation regardless of a thread identifier (ID).

If it is determined a particular thread occupies a number of entries of the shared resource greater than a predetermined high watermark value (conditional block 318), then in block 326, this particular thread may be flagged as a high consumer of this shared resource. A corresponding register may be set and the particular thread may be stalled from allocating any more entries within the shared resource. By stalling this particular thread, it may be easier for other threads to allocate a minimal quota of entries within the shared resource and avoid starvation. Control flow of method 300 then moves from block 326 to block A.

It is noted that at a later point in time, this particular thread may have the stall released. For example, the stall may be released in response to detecting the particular thread occupies a number of entries of the shared resource that fall below a predetermined low watermark value. Also, it may be discovered that a single set of values for high- and low-watermark pairs may not provide optimal performance in all cases. In one embodiment, additional information may be stored, such as different ranges for high- and low-watermark values depending on a number of active threads in the processor. In such an embodiment, the number of active threads in the processor may be used to determine what watermark values are used. For example, the number of threads may be used to select one pair of high- and low-watermark values from a set of multiple pairs. The number of active threads may be represented by a value stored in a register or other location as desired. In another embodiment, a range of the number of active threads in the processor may be used to select one pair of high- and low-watermark values from a set of multiple pairs. For example, ranges of 2-3, 4, and 5-8 active threads in a processor that supports 8 active threads may be used. In one embodiment, if a single thread is active, then all shared resources may be made available for the single thread.

If no entries are allocated (conditional block 314), and entries do exist for the particular thread within the shared resource (conditional block 320), then in block 322, corresponding counters may be updated. For example, an idle thread counter, which measures an amount of time a thread occupies the shared resource with no processing, may be incremented. If a corresponding idle counter value reaches a predetermined threshold value (conditional block 324), then the particular thread may be stalled from allocating any more entries within the shared resource. In one embodiment, a history value may be stored (e.g., in a history register) which corresponds to a number of times the idle counter reaches a predetermined threshold value during a given period of time. Corresponding high- and low-watermarks may be dynamically determined for the particular thread based on the value stored in this history register. For example, additional information may be stored, such as different ranges for high- and low-watermark values depending on the value stored in the history register. The history value may be used to select one pair of high- and low-watermark values from a set of multiple pairs stored in a table. In another embodiment, selection of one pair of high- and low-watermark values from a set of multiple pairs stored in a table may be based on both the number of active threads in the processor and the history value, and or any other factors as desired. Subsequent to reaching a threshold in block 324, control flow of method 300 moves to block 326.

If no entries are allocated (conditional block 314), and entries do not exist for the particular thread within the shared resource (conditional block 320), then control flow of method 300 moves to block A. Control flow of method 300 returns to block 304 via block B if no pipeline flush exists for the corresponding thread (conditional block 328). A pipeline flush may be caused by a branch misprediction, a trap, a data cache miss to main memory, or other. Otherwise, if a pipeline flush does exist for the corresponding thread (conditional block 328), then in block 330, counters and control registers are reset. If a stall signal is asserted for the thread, such as the thread allocates too many entries within the shared resource or the thread has been idle for too long within the shared resource, then this stall signal is deasserted. An idle time counter, a number of allocated entries register, and other control registers may be reset to zero. Then control flow of method 300 returns to block 304 via block B. The above description for method 300 may be generally applied to dynamically allocated shared storage resources in a processor core. With dynamic allocation of the entries within shared storage resources, a processor core may achieve greater utilization of the entries and allow scalability to a greater number N of threads.

Figure 4:
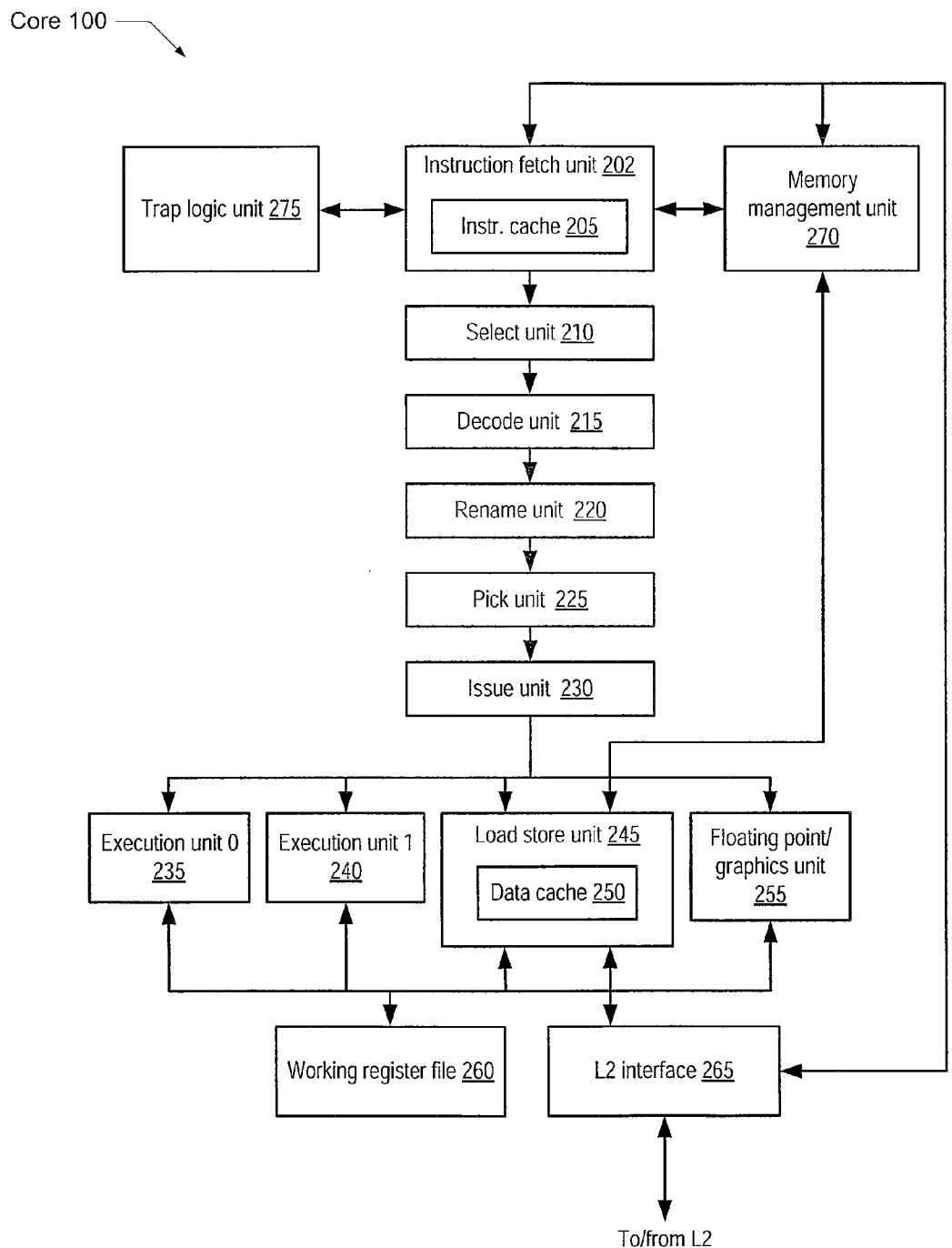
FIG. 4 is a generalized block diagram illustrating one embodiment of a processor core configured to perform dynamic multithreading.

Referring to FIG. 4, one embodiment of a processor core 100 configured to perform dynamic multithreading is shown. Processor core, or core, 100 may utilize conventional processor design techniques such as complex branch prediction schemes, out-of-order execution, and register renaming techniques. Core 100 may include circuitry for executing instructions according to a predefined instruction set. For example, the SPARC instruction set architecture (ISA) may be selected. Alternatively, the x86, x86-64, Alpha, PowerPC, MIPS, PA-RISC, or any other instruction set architecture may be selected. Generally, processor core 100 may access a cache memory subsystem for data and instructions. Core 100 may contain its own level 1 (L1) and level 2 (L2) caches in order to reduce memory latency. Alternatively, these cache memories may be coupled to processor cores 100 in a backside cache configuration or an inline configuration, as desired.

In one embodiment, processor core 100 may support execution of multiple threads. Multiple instantiations of a same processor core 100 that is able to concurrently execute multiple threads may provide high throughput execution of server applications while maintaining power and area savings. A given thread may include a set of instructions that may execute independently of instructions from another thread. For example, an individual software process may consist of one or more threads that may be scheduled for execution by an operating system. Such a core 100 may also be referred to as a multithreaded (MT) core. In one embodiment, core 100 may be configured to concurrently execute instructions from a variable number of threads, such as up to eight concurrently executing threads.

In one embodiment, core 100 may be configured for multithreaded, out-of-order execution. More specifically, in one embodiment, core 100 may be configured to perform dynamic multithreading. Generally speaking, under dynamic multithreading, the execution resources of core 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be input/output (I/O)-bound rather than processor-bound—completion of an individual request may need I/O accesses (e.g., to relatively slow memory, network, or storage devices) that dominate the overall time needed to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to dynamically allocate processor resources in a manner that flexibly adapts to workloads that vary along the continuum described above. In one embodiment, core 100 may be configured to implement fine-grained multithreading, in which core 100 may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, core 100 may be configured to efficiently process workloads that depend more on concurrent thread processing than individual thread performance.

In one embodiment, core 100 may also be configured to implement out-of-order processing, speculative execution, register renaming and/or other features that improve the performance of processor-dependent workloads. Moreover, core 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

In the illustrated embodiment, core 100 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 102 may be implemented. Alternative configurations and variations are possible and contemplated.

Instruction fetch unit (IFU) 202 may be configured to provide instructions to the rest of core 100 for execution. In one embodiment, IFU 202 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 202 may include a number of data structures in addition to instruction cache 205, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified. Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that needs further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur.

In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc. In one embodiment, TLU 275 may be configured to flush all instructions from the trapping thread from any stage of processing within core 100, without disrupting the execution of other, non-trapping threads.

In the illustrated embodiment, L2 interface 265 may be configured to provide a centralized interface to the L2 cache associated with a particular core 102, on behalf of the various functional units that may generate L2 accesses. In one embodiment, L2 interface 265 may be configured to maintain queues of pending L2 requests and to arbitrate among pending requests to determine which request or requests may be conveyed to L2 cache during a given execution cycle.

In one embodiment, during each execution cycle of core 100, IFU 202 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. To perform the fetch, in one embodiment, IFU 202 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from L2 cache 105. In some embodiments, IFU 202 may also be configured to prefetch instructions into instruction cache 205 before the instructions are actually requested to be fetched.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 202 may be configured to predict the direction and target of CTIs (or, in some embodiments, a subset of the CTIs that are defined for an ISA) in order to reduce the delays incurred by waiting until the effect of a CTI is known with certainty.

Through the operations discussed above, IFU 202 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 102, select unit 210 may be configured to select up to one ready thread out of the maximum number of threads concurrently supported by core 102 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 102 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Figure 5:
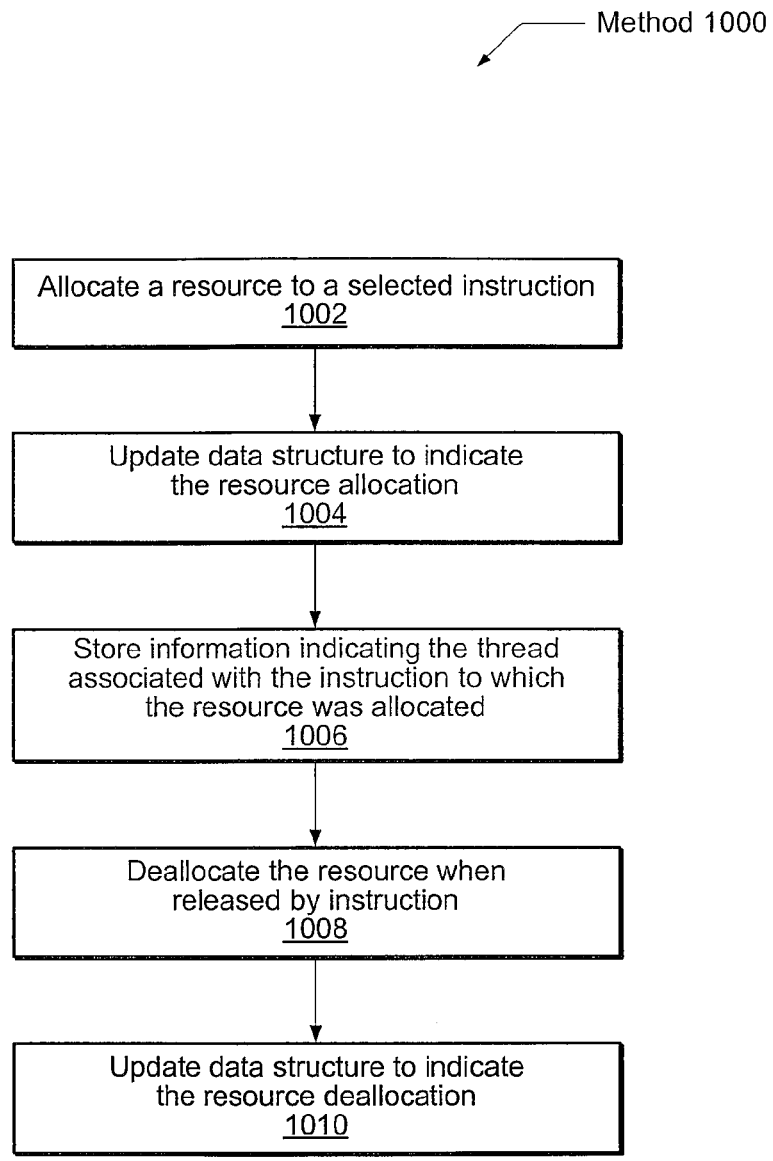
FIG. 5 is a generalized flow diagram of one embodiment of a method for performing out-of-order allocation and deallocation of resources.

Before continuing with a description of components 215-265, a further description of the allocation of resource tags is provided here. Referring now to FIG. 5, one embodiment of a method 1000 for performing out-of-order allocation and deallocation of resources is shown. In one embodiment, select unit 210 may be configured to support out-of-order allocation and deallocation of resources. In this example, the method may include allocating an execution resource to a selected instruction, as in 1002. For example, in some embodiments, a select unit, such as select unit 210 may perform the allocation. In this example, the method may include updating a data structure to indicate that the resource has been allocated to a selected instruction, as in 1004. In some embodiments, select unit 210 may include an allocate vector in which each entry corresponds to an instance of a resource of a particular resource type and indicates the allocation status of the resource instance. Select unit 210 may be configured to update an element of the data structure to indicate that the resource has been allocated to a selected instruction. For example, select unit 210 may include one allocate vector corresponding to entries of a reorder buffer, another allocate vector corresponding to entries of a load buffer, and yet another allocate vector corresponding to entries of a store buffer. As illustrated in FIG. 5, the method may include storing information indicating the thread associated with an instruction to which a resource is allocated, as in 1006. For example, each thread in a multithreaded system may be associated with a unique thread identification number (tid). In some embodiments, select unit 210 may store this tid to indicate resources that have been allocated to the thread associated with the tid.

As illustrated by FIG. 5, the method may, in various embodiments, include performing deallocation of a system resource when the resource is released, as shown in 1008. For example, in some embodiments, a select unit, such as select unit 210, may perform the deallocation in response to various system conditions that may cause a resource to be released by an instruction. For example, an instruction may successfully complete its execution and may no longer require the allocated resource. In this case, select unit 210 may be configured to deallocate the resource(s) allocated to the particular instruction. For example, when an instruction is committed, the instruction's allocated reorder buffer entry may be deallocated by select unit 210. In another example, a thread may release all allocated resources allocated to the given thread during a thread-specific flush, e.g., in response to an instruction exception or an external interrupt. As illustrated in FIG. 5, in response to the resource being deallocated, the method may include updating the corresponding resource allocate vector entry to indicate that the resource has been deallocated, as in 1010. In some embodiments, a resource that has been deallocated may be eligible to participate in a subsequent allocation exercise during a future execution cycle.

While the example illustrated in FIG. 5 and discussed above describes the allocation and deallocation of a single resource, in some embodiments, select unit 210 may be configured to allocate and/or deallocate multiple resources (e.g., multiple instances of one resource type and/or resources of different types) in a single execution cycle to support improved machine performance. In some embodiments, multiple resources of different types may be assigned to an instruction in a single cycle. For example, select unit 210 may allocate both a store buffer entry and a reorder buffer entry to a store instruction during a single execution cycle. As described above, various system conditions may cause a single resource to be released and deallocated in a single execution cycle. Similarly, various system conditions may result in the release and deallocation of multiple resources in a single execution cycle (i.e. both the store buffer entry and the reorder buffer entry, in the example above). For example, a thread-specific flush may release all resources allocated to a particular thread. In this case, for better system performance, select unit 210 may be configured to release, in a single execution cycle, all resources allocated to the particular thread. In some embodiments, select unit 210 may be configured to use the stored tid for the flushed thread to locate all resources currently allocated to the flushed thread. In this embodiment, the select unit may be configured to deallocate, in a single execution cycle, all of the resources allocated to the flushed thread.

In some embodiments, select unit 210 may include a resource tag generator configured to support out-of-order allocation and deallocation of resources. The resource tag generator may be configured to generate resource tags for use by select unit 210. In some embodiments, each resource tag may represent one instance of an available resource. The resource tag generator may be configured to provide available resource tags to select unit 210 to support out-of-order allocation of a resource to an instruction. The resource tag generator may also reclaim resource tags from select unit 210 to support out-of-order deallocation of instructions. In other embodiments, the resource tag generator may be included within other units of core 100 or may be a separate unit within core 100.

In some embodiments, the resource tag generator of select unit 210 may be configured to use multiple resource allocate vectors to provide available resource tags of different types to select unit 210. For example, select unit 210 may be configured to employ an allocate vector corresponding to a reorder buffer, another allocate vector corresponding to a load buffer and yet another allocate vector corresponding to a store buffer. In various embodiments, a resource allocate vector may include multiple entries, and each entry may correspond to one instance of a particular resource type. In some embodiments, the entries of a resource allocate vector may be sequentially addressable. In various embodiments, the number of entries in a resource allocate vector may represent the total number of resources available for the particular resource type represented by the resource allocate vector. A resource allocate vector entry representing an instance of a particular resource type may be considered a resource tag. The value of each entry in a resource allocate vector may indicate whether the corresponding resource tag has been allocated in the system. For example, an entry value of zero may indicate that a resource tag is available for allocation and an entry value of one may indicate that the resource tag has been allocated and is unavailable. In some embodiments, all entries of the resource allocation vector may initially be zero, since no resource tags have been allocated. Once a resource tag has been allocated, the resource tag generator may be configured to set the corresponding entry of the resource allocate vector to a value of one. Upon deallocation of the resource, resource tag generator may be configured to reset the corresponding entry of the resource allocate vector to a value of zero. In other embodiments, different encodings of the values of each entry or of collections of entries in a resource allocate vector may be used to indicate whether resources are available for allocation.

In some embodiments, a resource allocate vector may be shared between multiple threads, enabling allocation of a particular resource type to the multiple threads within a multi-threaded system. As described above, in some embodiments, select unit 210 may be configured to store a thread identification (tid) to indicate resources that have been allocated to a particular thread. For example, when a resource is allocated and the corresponding allocation vector entry updated to indicate allocation of the resource, the tid for the thread to which the resource was allocated may be stored in association with the corresponding allocation vector entry. In some embodiments, the tid may be stored in the resource allocate vector entry corresponding to the resource that has been allocated to the thread. In other embodiments, the tid may be stored in another data structure within select unit 210, and may be associated with the resource allocate vector entry corresponding to the resource that has been allocated to the thread.

In some embodiments, the resource allocate vectors may be used by the resource tag generator of select unit 210 to manage out-of-order allocation and deallocation of resources. As described above, each entry of a resource allocate vector may correspond to a respective instance of a particular resource type and the entries of the resource allocate vector may be sequentially addressable. The resource tag generator may be configured to update the value of a resource allocate vector entry to indicate that the corresponding resource has been allocated or deallocated, as described above. In some embodiments, this allocation or deallocation process may occur out-of-order when the resource tag generator updates an entry of the resource allocate vector that is not sequentially adjacent to another entry updated in the last allocation or deallocation operation for a resource of the same type.

As noted above, the resource tag generator of select unit 210 may be configured to use resource allocate vectors to provide resource tags of shared resources to select unit 210. In one example, a 32-entry reorder buffer allocate vector (ROBAV) may be maintained by the resource tag generator and used to manage the resources of the reorder buffer (ROB). The ROBAV may be configured to indicate allocation and deallocation of entries available in the ROB. A ROB entry may be configured to maintain state information associated with an instruction, beginning when the instruction enters the rename state. Upon successful commitment of the instruction without exception, the ROB entry may no longer reflect state information associated with the instruction. In some embodiments, the ROB entry may be deallocated upon successful commitment of the instruction. In this example, a 32-entry ROBAV may be configured to represent 128 entries of the ROB. Thus, each entry in a 32-bit ROBAV may represent four of the 128 ROB tags. For example, entry 0 in the ROBAV may represent ROB tags 0, 1, 2, and 3, entry 1 may represent ROB tags 4, 5, 6, and 7, and so on. In some embodiments, representing four ROB tags with a single ROBAV entry may improve the efficiency of tag management, as it may be easier to manage 32 tags as opposed to 128 tags. In addition, tag generation logic may be simplified, with a ROBAV length of 32 entries instead of 128 entries. In other embodiments, different size groups of the ROB tags may be used, or grouping of ROB tags may not be used at all.

In some embodiments, the resource tag generator may be configured to provide a group of four ROB tags represented by one entry in the ROBAV vector to select unit 210 for allocation to selected instructions. In some embodiments, the four ROB tags may be allocated, one to each instruction, by select unit 210. When the first ROB tag from a group is allocated, the tid for the thread to which the ROB tag is allocated may be associated with the ROBAV entry corresponding to the ROB tag group, as described above. The remaining ROB tags from the ROB tag group may now be reserved for that particular thread, since the tid has already been preserved in association with the group. Select unit 210 may be configured to allocate the remaining ROB tags from the group to the particular thread in subsequent cycles. In some embodiments, the resource tag generator may also be configured to reclaim groups of ROB resource tags that have been deallocated. When a group of ROB tags is allocated or deallocated, the resource tag generator may update the corresponding entry in the ROBAV to indicate the change in availability of the ROB tags.

Another example of a resource allocate vector is a store buffer allocate vector (SBAV). In some embodiments, a 32-entry SBAV may be maintained by the resource tag generator and used to manage the resources of the store buffer (SB). The SBAV may be configured to indicate allocation and deallocation of the 32 entries available in the SB. An SB entry may be configured to hold store data for an uncommitted store instruction. In some embodiments, the SB entry may be deallocated upon successful commitment of the store instruction. In this example, the 32-entry SBAV may be configured to represent the 32 entries of the SB. Thus, each SB entry may be represented by a respective SB resource tag in the SBAV. For example, entry 0 in the SBAV may represent SB tag 0, entry 1 may represent SB tag 1, and so on. In some embodiments, the resource tag generator may be configured to provide available SB resource tags to select unit 210 for allocation to selected instructions. In some embodiments, the resource tag generator may also be configured to reclaim SB resource tags that have been deallocated. When an SB tag is allocated or deallocated, the resource tag generator may update the corresponding entry in the SBAV to indicate the change in availability of the SB tag.

In yet another example, a 64-entry load buffer allocate vector (LBAV) may be maintained by the resource tag generator and used to manage the resources of the load buffer (LB). The LBAV may be configured to indicate allocation and deallocation of the 64 entries available in the LB. An LB entry may be configured to hold load instructions which have been issued but not yet committed. In some embodiments, LBAV the LB entry may be deallocated upon successful commitment of the load instruction. In this example, the 64-entry LBAV may be configured to represent the 64 entries of the LB. Thus, each LB entry may be represented by a respective LB resource tag in the LBAV. For example, entry 0 in the LBAV may represent LB tag 0, entry 1 may represent LB tag 1, and so on. In some embodiments, the resource tag generator may be configured to provide available LB resource tags to select unit 210 for allocation to selected instructions. In some embodiments, the resource tag generator may also be configured to reclaim LB resource tags that have been deallocated. When an LB tag is allocated or deallocated, the resource tag generator may update the corresponding entry in the LBAV to indicate the change in availability of the LB tag.

In some embodiments, the resource tag generator of select unit 210 may perform a search of an allocate vector to locate a resource tag available for allocation. In various embodiments, the tag generator may be configured to search an allocate vector during each execution cycle and to store available resource tag(s) such that the tag(s) are ready for select unit 210 to allocate to selected instructions. Searching for available resources during each execution cycle before the resources have been requested by select unit 210 may decrease latency times, as instructions may not be delayed while waiting for searches to complete.

Figure 6:
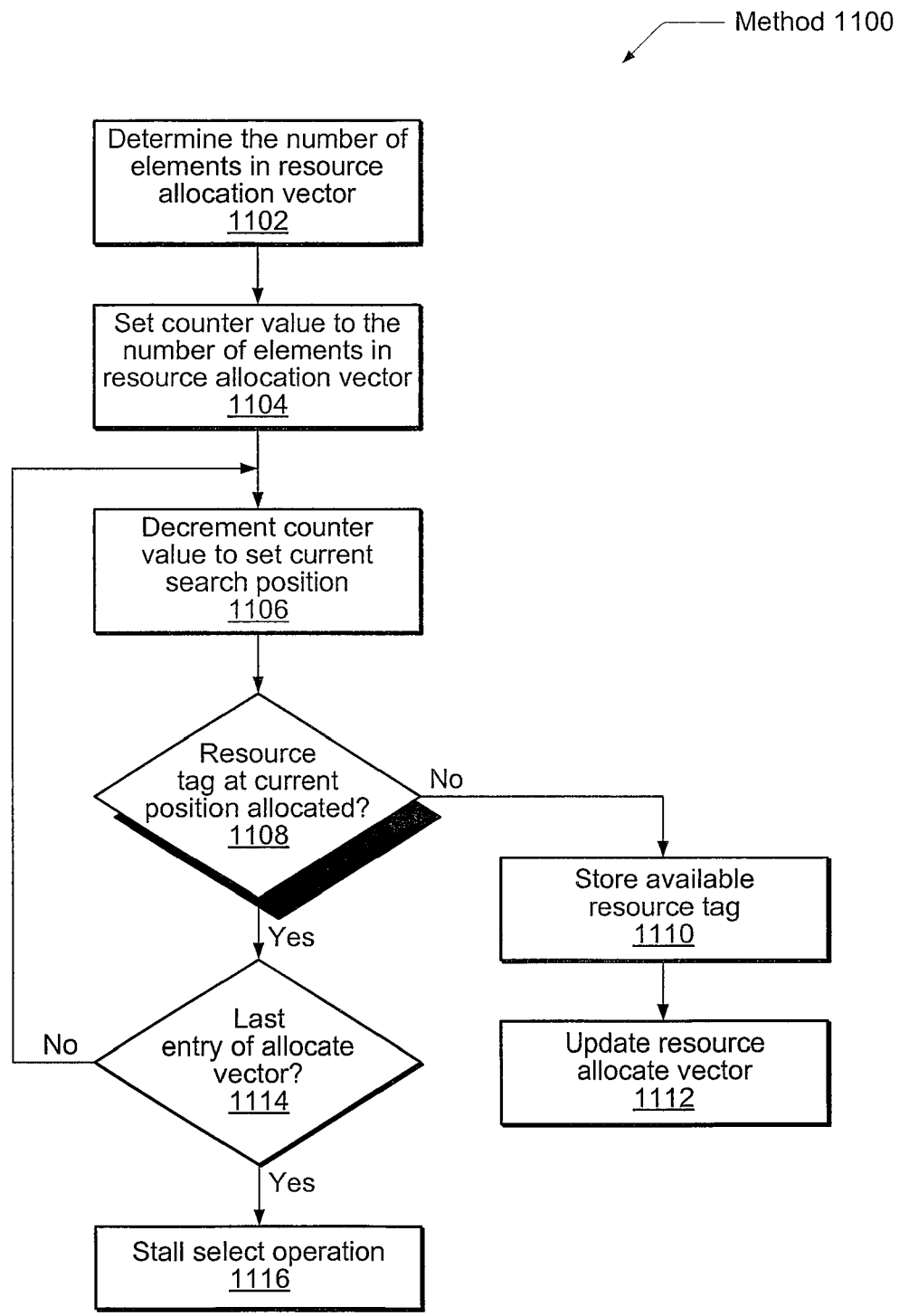
FIG. 6 is a generalized flow diagram of one embodiment of a method for searching for an available resource tag in a resource allocate vector.

Turning now to FIG. 6, one embodiment of a method for searching for an available resource tag in a resource allocate vector is shown. Similar to methods 300, 1000, and other methods described, for purposes of discussion, the steps in this embodiment are shown in sequential order. However, some steps may occur in a different order than shown, some steps may be performed concurrently, some steps may be combined with other steps, and some steps may be absent in another embodiment. In one embodiment, the method 1100 may include determining the number of total entries included in a resource allocate vector in block 1102.

For example, in some embodiments, a resource tag generator of select unit 210 may determine the total number of entries included in a resource allocate vector for a particular resource. In this example, the method may include setting a counter value equal to the number of total entries, as in 1104. In some embodiments, the counter value may be configured to represent an index position within the resource allocate vector and a resource tag generator of select unit 210 may be configured to use the counter value to single-step through each entry of the vector.

As illustrated in FIG. 6, the method may include setting the starting search position by decrementing the counter, as in 1106. In some embodiments, the entries of a resource allocate vector may be indexed from right to left, with the rightmost entry at index position 0 and the leftmost entry at an index position equal to one less than the total number of entries. Thus, in some embodiments, the operation illustrated at 1104 may include the resource tag generator setting the starting search position at the leftmost entry of the resource allocate vector. As illustrated in FIG. 6, the method may include examining the value of the resource allocate vector entry at the index position indicated by the counter, as shown in 1108. For example, the resource tag generator may determine, based on the value of the vector entry, whether the corresponding resource tag has been allocated. If the resource tag generator determines that the resource tag has not been allocated, shown as the negative exit of 1108, the search is complete. The resource tag generator has found an available resource tag at the position indicated by the current counter value. In some embodiments, the available resource tag, or an identifier thereof, may be stored, as in 1110, within select unit 210 for allocation to a selected instruction. For example, a resource tag identifier may be stored in a FIFO structure within select unit 210, thus indicating that the resource is available for allocation. In some embodiments, the method may include updating the allocate vector, as in 1112, indicating that the allocated resource is no longer available.

In the method illustrated by FIG. 6, if the resource tag at the current search position in the vector has already been allocated, shown as the positive exit of 1108, the method may include determining whether the last entry of the allocate vector has been reached, as in 1114. For example, if the search counter value is equal to zero, the index position in the vector may also be zero, indicating that the last entry of the vector has been reached. If the last entry of the vector has been reached, shown as the positive exit of 1114, the method may include stalling the operation of select unit 210, as in 1116. If additional entries remain in the resource allocate vector, shown as the negative exit of 1114, the method may include continuing the search for an available resource tag. As shown by the feedback from 1114 to 1104, the method may include decrementing the value of the counter, moving the search position to the next vector entry. In some embodiments, the resource tag search may continue in a similar manner, repeating the operations illustrated in 1104, 1108 and 1114 until an available resource tag is found or until all resource allocate vector entries have been examined.

While the example above describes one search through a resource allocate vector to obtain a single available resource tag, in other embodiments multiple searches may be performed. For example, a faster search result may be returned if multiple searches are performed concurrently within a resource allocate vector. In some embodiments, the vector may be divided into two or more sections and a separate search may be performed on each section of the vector. The searches may execute in the same direction, (e.g., from left-to-right through the resource allocate vector, as described above), or the searches may proceed from opposite ends of the vector, in different embodiments. In some embodiments, when multiple searches are performed from opposite ends of the resource allocate vector, the searches may overlap, and may examine at least some of the same entries of the vector. In the case of such an overlap, special logic may be used to determine how to allocate an available resource in response to finding only one (or zero) available resource(s) in the allocate vector. These multiple, concurrent searches may enable a faster search result, as multiple portions of the vector may be examined simultaneously. In some embodiments, the search result may be the first available resource tag discovered by any of the multiple searches. If two or more searches return a result at the same time, the tag generator may prioritize the search results to ensure that there is only one final search result. In some embodiments, the index position of the resource tag may determine a priority of the resource tag. For example, tag 0 may have the highest priority and tag 31 may have the lowest priority, according to some embodiments.

Figure 7:
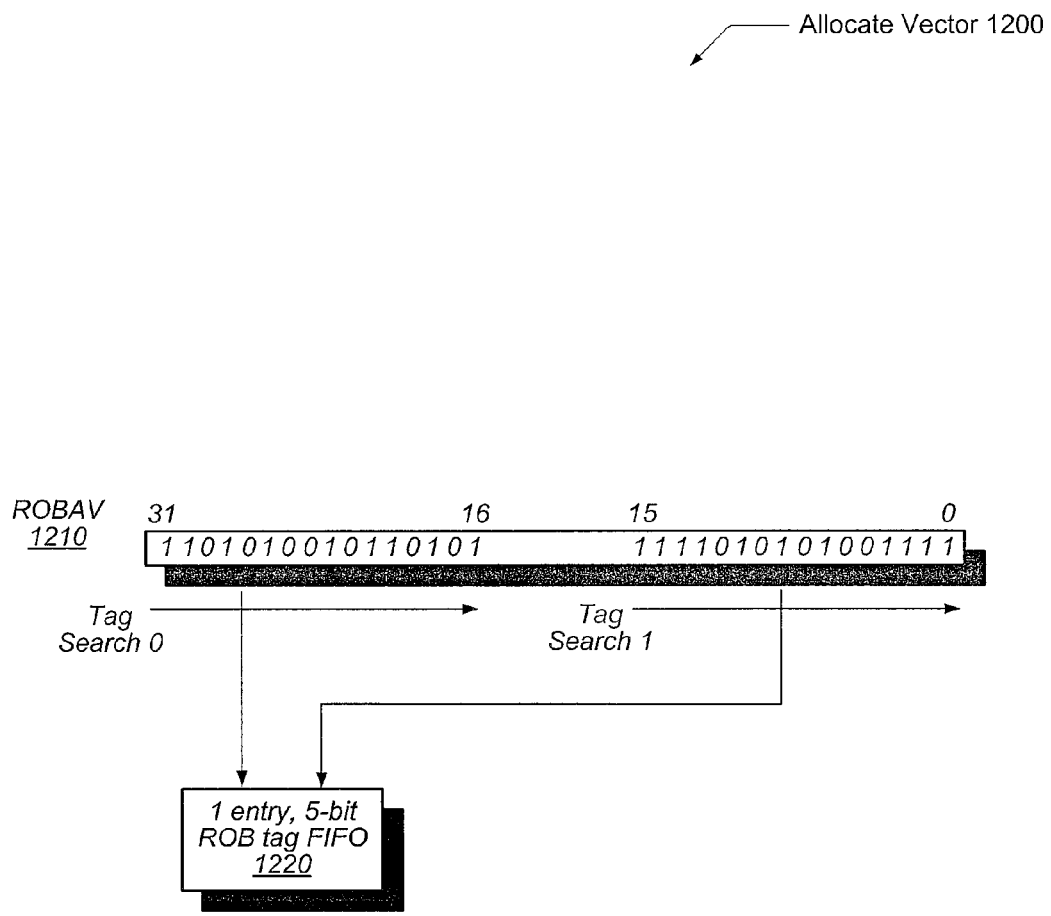
FIG. 7 is a generalized block diagram of one embodiment of an allocation vector.

The methods for performing multiple searches described above may be further illustrated by way of example. Referring now to FIG. 7, one embodiment of an allocation vector is shown. FIG. 7 illustrates an example of an ROBAV search in which the resource tag generator of select unit 210 may search the 32-entry ROBAV to locate an available group of ROB tags, according to some embodiments. In this example, two independent tag searches of ROBAV 1210 may be executed concurrently, in the upper and lower halves of the allocate vector. For example, left-to-right tag searches 0 and 1 may be performed on ROBAV[31:16], and ROBAV[15:0], respectively, as shown in FIG. 7. The search may return a 5-bit encoding corresponding to the first available resource tag group discovered in the search. If both searches return a search result at the same time, the resource tag generator may be configured to prioritize the two search results, as described above, to ensure that there is only one final search result. As described above, the resource tag generator may be configured to store an available resource tag group to indicate that the group is ready when needed by select unit 210 for allocation to a selected instruction. For example, in some embodiments, the resource tag generator may be configured to fill a single-entry ROB tag FIFO 1220 with the 5-bit encoding that corresponds to the available resource tag group. In some embodiments, the resource tag generator may be configured to perform a search of ROBAV 1210 for each execution cycle in an effort to keep the single-entry ROB tag FIFO 1220 full. In addition to adding the 5-bit encoding to ROB tag FIFO 1220, the tag generation logic may also be configured to update the corresponding entry in ROBAV 1210 to indicate that the resource tag group is no longer available.

In another example (not shown), the resource tag generator of select unit 210 may search a 32-entry SBAV to locate an available SB tag. In a manner similar to that described above, two independent tag searches of the SBAV may be executed concurrently, in the upper and lower halves of the allocate vector. For example, left-to-right tag searches 0 and 1 may be completed on SBAV [31:16], and SBAV [15:0], respectively. The search may return a 5-bit encoding corresponding to the first available resource tag discovered in the search. If both searches return a search result at the same time, the resource tag generator may be configured to prioritize the two search results as described above, to determine the final search result. As described above, the resource tag generator may be configured to store an available resource tag to indicate that the tag is available when needed by select unit 210 for allocation to a selected instruction. For example, the resource tag generator may be configured to fill a single-entry SB tag FIFO with the 5-bit encoding that corresponds to the available resource tag. In some embodiments, the resource tag generator may be configured to perform a search of the SBAV for each execution cycle in an effort to keep a single-entry SB tag FIFO full. In addition to adding the 5-bit encoding to the SB tag FIFO when an available resource tag is located, the resource tag generator may also be configured to update the corresponding entry in the SBAV to indicate that the resource tag is no longer available.

In some embodiments, multiple searches through a resource allocate vector may be performed to obtain multiple search results. In various embodiments, select unit 210 may allocate more than one resource tag to a selected instruction within a single execution cycle. In this case, the resource tag generator may perform multiple searches of the vector in a manner similar to that described above, resulting in multiple search results rather than a single search result. In some embodiments, the multiple search results may be stored in one or more multiple entry FIFOs.

Referring again to core 100 of FIG. 4, generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 102 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking LSU 245 may also include hardware configured to support atomic load-store instructions, memory-related exception detection, and read and write access to special-purpose registers (e.g., control registers).

Regarding the pick queue in the pick unit 225, in order to maintain high performance, the selection of multiple decoded and renamed instructions to send to the issue unit 230 occurs in a single pipeline stage. As described above, a pick queue within the pick unit 225 may store a number of decoded and renamed instructions as well as information about the relative age and status of the stored instructions. During a single clock cycle Pick pipeline stage, instructions may be picked from a number of instructions stored in the pick queue within the pick unit 225. Picked instructions are sent to the issue unit 230.

Logic within the pick unit 225 may split the instruction pick operation into two tasks, wherein a first task is responsible for dataflow ordering, such as instruction dependencies. A subsequent second task is responsible for resource allocation and age tracking A dependency cycle formed between logic to perform the first task which identifies ready instructions, and logic to perform the second task which selects a set of ready instructions for execution, forms a tight loop which is well known as critical to performance as described by E. Borch, et al. Loose loops sink chips, in Proceedings of HPCA-8, February 2002.

Typically, during the first task, which is responsible for dataflow ordering, an instruction is considered ready if it is not dependent on any other instructions in the pick queue. In order to determine an instruction stored in the pick queue is now able to obtain source operands from completed older (in program order) instructions, a broadcast of the results may be used to notify younger (in program order) dependent instructions. Generally, a broadcast observes results being generated and notifies waiting dependent instructions that are now ready for execution. Further details of both the pick operation, including both first and second tasks, and examples of dynamically allocated shared resources within processor core 100 are provided below.

Dynamically Allocated Branch Resources in a Processor Core

Front End Pipeline—Branch Resources

One example of a dynamically allocated shared resource within a processor core 100 is a branch far table (BFT) that may be used to predict a target address for far program counter (PC)-relative indirect branches and jump instructions of non-return type. The BFT may be indexed using bits [12:5] of an instruction fetch address. During a target misprediction, the BFT entry for a corresponding control flow instruction may be updated. When a control flow instruction executes, an execution unit provides bits [51:2] of the PC of the control flow instruction. The IFU 202 may use this portion of the PC to form bits [12:5] of the BFT index. In one embodiment, each entry of BFT holds 4 target addresses. Bits [4:3] of the PC may be used to determine which of the 4 target addresses are updated. On a target misprediction, an execution unit may also provide the actual target address, and the BFT may be updated using this data.

In one embodiment, the BFT is a 4 KB direct mapped array. Far PC-relative branches may have their targets on a different 8 KB page than the current instruction fetch address. Far PC-relative branches, and indirect branches may be referred to as "Far Branches". In one embodiment, the BFT is shared by all threads.

The BFT may be organized to include 256 sets, and each set may hold 4 quadrants of 32 bits each for a total of 4 far/indirect branches per set. Since the probability of two back-to-back instructions being control transfer instructions is low, a single entry may be used to hold the target for a pair of instructions. On every fetch, one entry from a set may be read out of the BFT to predict the target of the taken far/indirect branches on the current fetch line. In one embodiment, the BFT may be indexed with bits [12:5] of the instruction fetch address. The quadrants may be indexed using bits 4 and 3 of the instruction fetch address. A 32-bit entry of the BFT may hold the following information: a 30-bit target offset [31:2] holding a virtual address [31:2] of the target address (TA) and a 2-bit field.

The 2-bit field may have the following 4 states: an initial value of 0 indicates that there is no target address stored for the branch far instruction; a value of 1 may indicate an overflow condition, wherein the target address [51:32] does not equal the instruction fetch address [51:32] and should be used to get the target address [51:32]; a value of 2 may indicate another overflow condition, wherein, again, the target address [51:32] does not equal the instruction fetch address [51:32] and an overflow register may be used to obtain the target address [51:32]; and a value of 3 may indicate a no overflow condition, wherein the target address [51:32] equals the instruction fetch address [51:32]. The target address may be formed by concatenating the instruction fetch address [51:32] with the target offset [31:2].

There may be two overflow registers for predicting far branches whose instruction fetch address [51:32] bits do not match the target address TA[51:32]. The overflow registers may be loaded on a target mispredict of a far branch, if the upper 20 bits of address are different between the target and the branch.

The BFT may be written on a target mispredict of a far branch. When execution units execute a Far Branch, the PC of the Far Branch may sent to the instruction fetch unit. If the Far Branch results in a target misprediction, then execution units may send the correct target address to the instruction fetch unit, and this target will get written into BFT.

In one embodiment, the instruction fetch unit (IFU) 202 may use the PC of the Far Branch and its target to determine if it is an overflow case by comparing bits [51:32] of the PC and the target of the branch. Also, for overflow cases, the IFU 202 may check if the target address [51:32] is already saved in either of the two overflow registers to avoid duplication. If the address bits are not found, then the IFU 202 may update one of the overflow registers with the new address. The IFU 202 may select which register to update based on a least-recently-used (LRU) algorithm. The IFU 202 may use the PC of the Far Branch and its target to determine and update the value of the 2-bit field for the quadrant being written. On a target mispredict the instructions being fetched in the fetch pipe stage may be flushed and the BFT may be updated. In one embodiment, if the BFT is not accessed when it is being updated, then the BFT may be implemented as a 1-read/write port array.

Another example of a dynamically allocated shared resource within a processor core 100 is a branch data array (BDA). Branch prediction logic may include a 64-entry BDA which holds information for all predicted control flow instructions. The BDA may be shared by each of the available N threads within core 100. Two entries corresponding to 2 predicted control flow instructions may be written every cycle in a predetermined branch prediction pipe stage of the IFU 202 pipeline. Every cycle, one entry corresponding to a branch being executed by an execution unit may be read out of the BDA.

Figure 8:
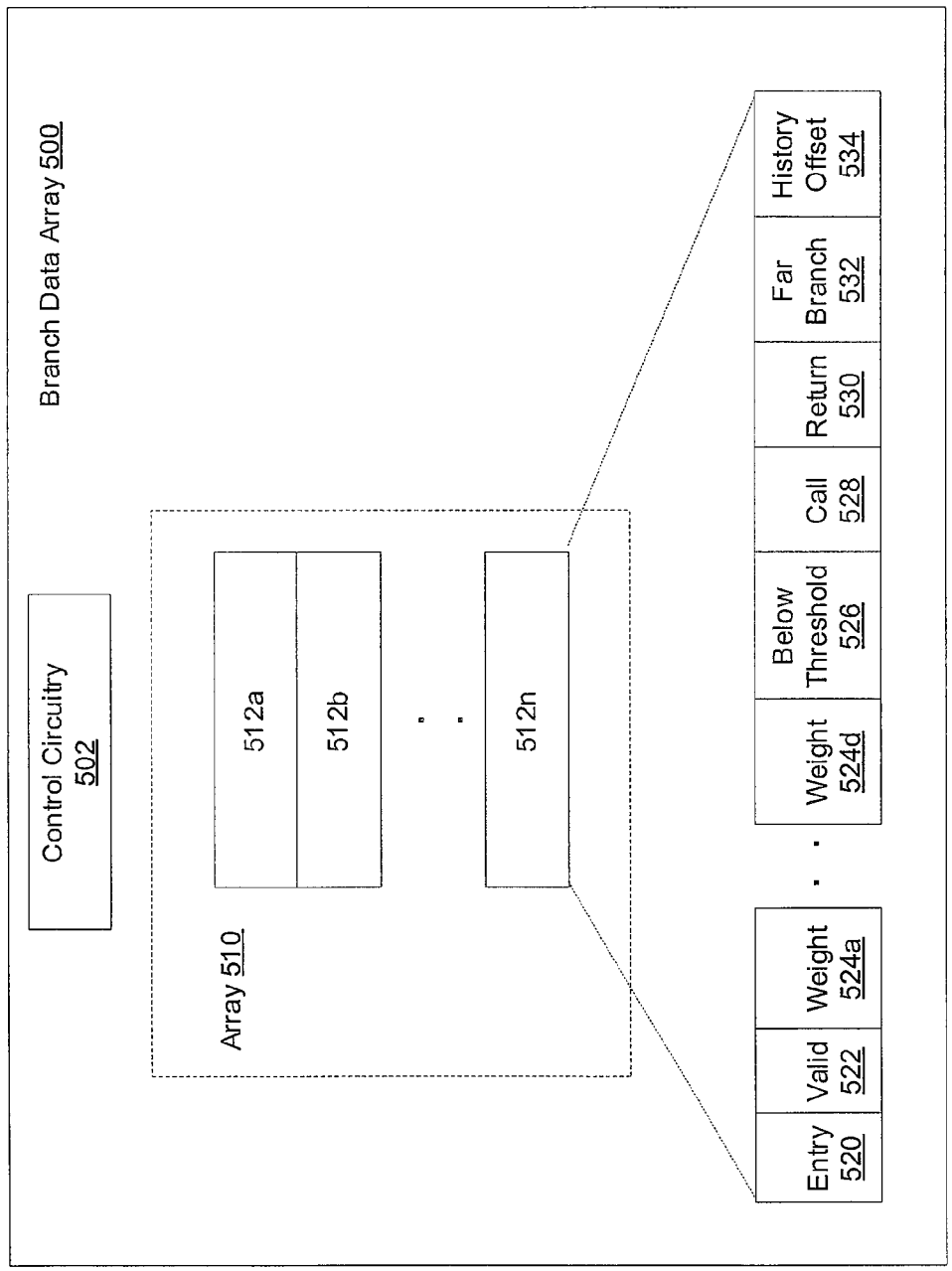
FIG. 8 is a generalized block diagram illustrating one embodiment of a branch data array.

Referring to FIG. 8, one embodiment of a branch data array (BDA) 500 is shown. In one embodiment, the BDA is implemented as a 1-read/2-write array. A single entry of the BDA 500 may comprise an entry number 520 and a valid field 522. In one embodiment, the entry number 520 corresponds to the position of an entry in the BDA 500, wherein entry 0 may be configured to be at the top of array 510 or at the bottom depending on logic preferences. The entry field 520 may be implied rather than an actual stored number. In one embodiment, entries 512 may be dynamically allocated. The valid field 522 for an entry may be updated with a value to indicate a valid entry when the entry is allocated.

Weight fields 524 may hold weight values used to predict the taken/not-taken direction of one or more control flow instructions in a currently fetched cache line. In one embodiment, each weight is a 6-bit value. These weight values may be summed in a predetermined manner wherein a comparison of a corresponding product value and a predetermined threshold determines the taken/not-taken direction. The below threshold field 526 may store a value indicating whether the corresponding product value is below the predetermined threshold. The call field 528 may indicate a corresponding instruction for an entry is a call instruction. Similarly, the return field 530 may indicate a corresponding instruction for an entry is a return instruction and the far branch field 532 may indicate a corresponding instruction for an entry is a far branch or an indirect branch with a branch target address in the BFT. In one embodiment, each of the fields 528-532 may include a single bit.

The history offset field 534 may store a count of a number of control flow instructions in a predetermined prior number of fetches. Although the fields are shown in this particular order, other combinations are possible and other or additional fields may be utilized as well. The bits storing information for the fields 520-534 may or may not be contiguous. Similarly, the arrangement of array 510 may use other placements for better design trade-offs.

In one embodiment, during each cycle, tag logic in the IFU 202 may allocate multiple BDA tags from a pool of available tags. For example, the IFU 202 may allocate each cycle 2 6-bit BDA tags from a pool of 64 tags. The IFU 202 may use the BDA entry corresponding to these tags to store the predicted branch information for the fetch initiated in that cycle. If the fetch has no branches then the tags are deallocated. Also, when a branch is executed by an execution unit, the BDA tag for that branch is deallocated. The IFU 202 may stall a fetch operation if no BDA tags are available.

Front End Pipeline—Rename Resources

The rename unit 220 may be responsible for renaming the destinations of instructions and resolving destination-source dependencies between instructions within a thread. In one embodiment, during each cycle, the rename unit 220 may receive two instructions from the decode unit 215. Each group of instructions may be called a decode group. In one embodiment, the rename unit 220 does not break the group of instructions received from the decode unit 215. All instructions in a decode group may be renamed. During a first phase of a rename pipe stage, the rename unit 220 may begin reading logical map tables (LMTs), which are to be further described shortly, for all the sources in the instruction decode group. The data read from the LMTs may be combined with intra-group dependencies to form a dependency vector for each instruction during a second phase of a rename pipe stage. The rename unit 220 may maintain an age vector for all instructions in the pick queue within the pick unit 225 on a per slot basis. The rename unit 220 may convey destination rename values to the LMT structures. The rename unit 220 may convey rename values to at least the pick queue within the pick unit 225, an instruction data array within the IFU 202, and a reorder buffer.

In one embodiment, the logical map tables (LMTs) translate logical register indices into physical tags. Processor core 100 may have two LMTs, such as one for integer and floating-point registers and one for condition codes and other miscellaneous registers. In one embodiment, the integer and floating-point LMT has 128 entries, wherein each entry may be allocated in each clock cycle to each thread of the available N threads supported by core 100. Turning now to FIG. 9, one embodiment of a logical map table configuration 600 is shown. Each entry of the LMT may store the information shown in table 610.

Referring to table 610, in one embodiment, the SE, SO, and S fields may be implemented as single bit fields. These fields may be used to determine whether a source has a particular condition associated with it, such as an evil-twin case, wherein a double-precision source is dependent on a single-precision destination. The thread ID field may be used to identify the correct LMT dependencies for a given thread. It may also be used to flush the proper thread-specific LMT entries during a pipeline flush. The logical field may contain the logical value associated with the physical tag index of a given entry.

The RV field may indicate whether the LMT entry is valid or not for renaming. The PQV field may indicate whether or not a corresponding LMT entry is valid in the pick queue within pick unit 225. Dependency vectors may be established in the pick queue if the corresponding destination is still in the pick queue. The PQ field may correspond to the pick queue entry for a given instruction in the LMT.

In one embodiment, the LMT has 2 ports for writing 2 different destinations per cycle. For write operations, physical tags may be used to index into the LMT. In addition, the LMT may have 2 content addressable memory (CAM) ports in order to maintain the RV field. Every write may perform a CAM match operation with a corresponding logical value of the write operation against the other logical values stored in the LMT. This comparison may be used to maintain the proper state of the RV field. In the case of a CAM hit, the RV bit may be reset for the corresponding LMT entry. This may ensure that the RV field including a single bit is only set for 1 entry in the LMT for a given logical value.

The LMT may have 6 CAM ports for reading up to 6 different sources per cycle. The logical value of each source is compared against the LMT entries to determine whether there is a match or not. In general, if the thread ID field and logical field of a source matches a LMT entry and the entry is valid (i.e. RV=1), then a successful match occurs and the entry may be read out for the given source.

The LMT may have 2 CAM ports for maintaining the correct state of the PQV field. Up to 2 instructions may be renamed each cycle. The PQ field of each instruction may be compared by CAM operation against entries within the LMT. If any entries match, the corresponding PQV field may be reset. Dependency vectors may be only established in the PQ if the corresponding destination is still in the PQ.

The LMT may have 1 CAM port for invalidating LMT entries upon a thread specific flush. The thread identifier of a flushing thread is compared by a CAM operation against the LMT. If any entries match, the RV and PQV bits may be reset. The LMT may have 1 CAM port for invalidating LMT entries upon commit. Whenever an even pair of instructions has been committed, the corresponding pair of physical entries in the LMT may be invalidated by resetting the corresponding RV fields.

A separate condition-code LMT may be used to track condition code renaming in processor core 100. Turning now to FIG. 10, one embodiment of a logical map table configuration 650 for a condition-code LMT is shown. The configuration of this LMT may be very similar to the configuration 600 in FIG. 9. Many of the fields in table 660 are a subset of the fields in table 610. Although the fields are shown in a particular order in tables 610 and 660, other combinations are possible and other or additional fields may be utilized as well. The bits storing information for these fields may or may not be contiguous. Similarly, the arrangements of tables 610 and 660 may use other placements for better design trade-offs. In addition to condition codes for both the integer and floating-point instructions, an LMT that utilizes the format in table 660 may also be for renaming the following miscellaneous registers, such as GSR {IM,IRND}, GSR {ALGN}, and GSR {BMASK}.

The rename unit 220 may ensure that the source operands of an instruction are renamed properly. In one embodiment, during each clock cycle, 2 instructions may be presented to the rename unit 220 by the decode unit 215 for dependency resolution. The rename unit 220 may preserve program order. A rename operation may determine for each source whether the data is being sourced by one of the prior instructions in the current group or by an earlier instruction that is still in the machine. The rename unit 220 may determine integer and floating-point source and destination dependencies within a current group by comparing the logical register index of each source with the logical register index value of each of the destinations of the prior instructions. If there is a match, the index of the source may be dependent on the physical tag of the instruction that matched. A 1-hot dependency vector for each renamed source may be generated based on the pick queue entry assigned to the matching destination.

The rename unit 220 may use a CAM-read port for each source. The index of each source may be compared to each of the entries in the corresponding LMT. Any entry that matches and is valid is read. However, only one entry may be expected to match. If the corresponding RV field is asserted, then the source may be considered renamed. An intra-group dependency has a higher priority form the data read from the LMT. If the PQV field is set, then a 1-hot dependency vector based on the pick queue entry may be generated for the source. The dependency vectors for all the sources of the instruction may be combined to create one dependency vector. The dependency vector for the instruction may also be combined with a pick queue vector to generate a final dependency vector. The final dependency vector may be subsequently conveyed to the pick queue.

Integer and floating-point condition-codes may be renamed in an analogous manner to the integer and floating-point registers using the conditional code LMT. The {IM, RND} and ALGN fields of a global shift register (GSR) may be renamed analogous to the integer and floating-point registers using the conditional code LMT. The rename unit 220 may maintain a 32-bit age vector on a per slot basis. The rename unit 220 may create an age vector for each instruction by using the appropriate slot age vector. The rename unit 220 may take age dependencies within the same rename group into account in the generation of the instruction's age vector.

Some of the information read from the LMTs may be conveyed to the Instruction Data Array each cycle. The physical tag and logical register index may be written into the instruction data array for each valid source. In one embodiment, if the entry read from LMT is valid, then the physical tag may be marked valid. Otherwise, the index may be marked valid.

In addition, the rename unit 220 may convey information to the reorder buffer (ROB) using an assigned physical tag. Information conveyed to the ROB may include an instruction PC, a logical register index, a valid bit if the instruction is producing a GPR or FP result, asserted valid bits to indicate if the certain fields of the GSR, integer condition codes, or floating-point condition codes modified by the instruction. Further, the ROB may receive speculative values of window registers and the ASI register after the execution of the instruction, wherein the ASI value is an immediate field and part of the instruction. If the ASI field matches certain values then the instruction is a complex 8 instruction. The ROB may also receive exception information available from the decode unit 215 and decode information needed for a commit pipe stage.

Front End Pipeline—Reorder Buffer

Each entry of an array within a reorder buffer may be configured to be allocated in each clock cycle by each thread of the available N threads supported by core 100. In one embodiment, the array within the ROB may be physically implemented as two arrays. In one embodiment, each of the two arrays comprises 64 entries. One array may store information for instructions with even physical tags, and the other array may store information for instructions with odd physical tags. This implementation may permit the use of arrays with one read port and one write port while still supporting the rename and commit of two instructions per cycle. In one embodiment, the ROB may convey information to 32 commit buffers: 8 sets of commit buffers, one set for each of 8 threads, and 4 buffers per set. Instructions may bypass the commit buffer and pass from the ROB directly to a commit pipeline. Physical tags may be allocated by the select unit 21. In one embodiment, the physical tags are allocated in groups of 4 tags, but there may be no ordering between groups of physical tags. This implementation may facilitate dynamic sharing of the entries within the ROB between the N threads.

Issue and Execute Pipeline—Pick Queue

Figure 11:
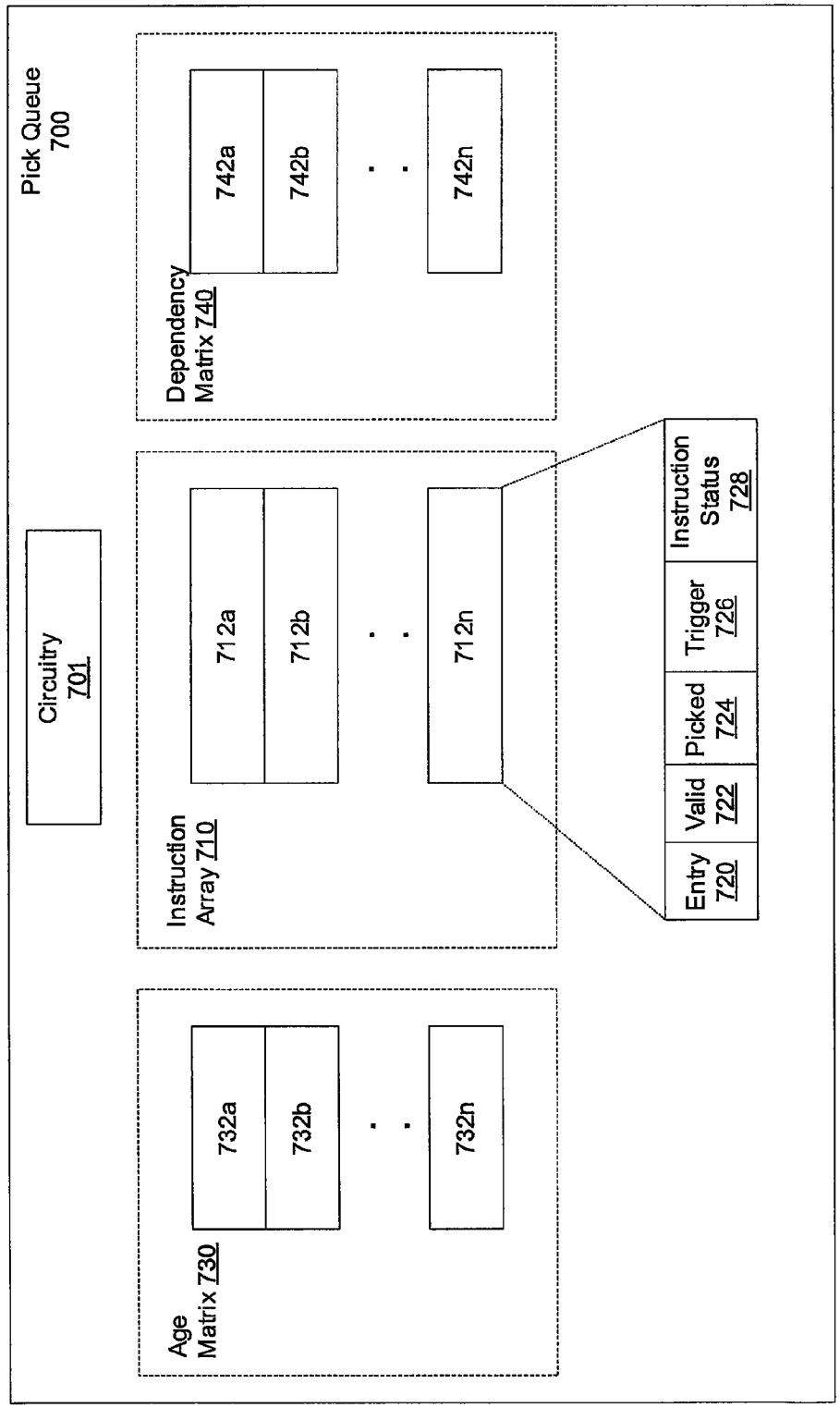
FIG. 11 is a generalized block diagram illustrating one embodiment of the entries of a pick queue.

Turning now to FIG. 11, one embodiment of a pick queue 700 configured to hold instructions that may be picked for execution is shown. In one embodiment, pick queue (PQ) 700 holds decoded (and possibly renamed) instructions in processor core 100. The buffered instructions may include micro-operations, or micro-ops, if core 100 is configured to support such operations. In one embodiment, the pick queue 700 includes an instruction array 710, age matrix 730, a dependency matrix 740, and circuitry 701 configured to control various aspects of the pick queue 700. Instruction array 710 may be used for maintaining status and characteristics of decoded and renamed instructions. Age matrix 730 may be used for hardware resource allocation and instruction age tracking Dependency matrix 740 may be used for dataflow ordering.

A single entry of the pick queue 700 may comprise corresponding entries in each of the instruction array 710, age matrix 730, and dependency matrix 740. For example, a first entry in the pick queue 700 may comprise entries 732a, 712a, and 742a. A second entry in the store queue 700 may comprise entries 732b, 712b, and 742b, and so on. In general, the pick queue 700 may be responsible for scheduling multiple instructions each clock cycle for execution.

One task of an instruction pick operation regarding dataflow ordering utilizes the instruction array 710 and the dependency matrix 740. The instruction array 710 in FIG. 11 comprises a plurality of entries 712, wherein each entry 712 may correspond to a decoded and renamed instruction. As used herein, elements referred to by a reference numeral followed by a letter may be collectively referred to by the numeral alone. For example, entries 712a-712n may be collectively referred to as entries 712. In one embodiment, each entry 712 includes an entry number 720, a valid field 722, a picked field 724, a trigger field 726, and an instruction status field 728. Although the fields are shown in this particular order, other combinations are possible and other or additional fields may be utilized as well. The bits storing information for the fields 720-728 may or may not be contiguous. Similarly, the arrangement of instruction array 710, age matrix 730, and dependency matrix 740 array may use other placements for better design trade-offs.

In one embodiment, the entry number 720 corresponds to the position of an entry in the pick queue 700, wherein entry 0 may be configured to be at the top of instruction array 710 or at the bottom depending on logic preferences. The entry field 720 may be implied rather than an actual stored number. In one embodiment, pick queue entries may be dynamically allocated in a previous (e.g., renaming) pipe stage. The valid field 722 for a queue entry is updated with a value to indicate a valid entry when the entry is allocated. As will be discussed further, a pick queue entry may be deallocated upon instruction completion if, for example, no load/store hazards exist for the corresponding pick queue entry. The valid field 722 may be reset to a value indicating an empty entry when the entry is deallocated.

Picked field 724 may be used to indicate a corresponding instruction has been picked. Also, the picked field 724 may be used to ensure the corresponding instruction is not subsequently re-picked. Between a first clock cycle when a particular instruction is picked and a second clock cycle when the particular entry is deallocated, the particular instruction is not re-picked due to a set value in the picked field 724. In various embodiments, between the first and second clock cycles, the particular instruction may be disqualified as being ready. The trigger field 726 may allow a younger dependent instruction to be picked prior to an older instruction that it depends on completing its operation. The status field 728 may contain additional information regarding the corresponding instruction.

One example of information stored in the instruction status field 728 may be a single bit that is asserted when it is known the corresponding instruction is an instruction type that produces results in a single cycle. For example, it may be known that an integer arithmetic instruction is able to produce a result in a single execution clock cycle.

Another example of a sub-field within the instruction status field 728 may be an enable bit that enables the use of the trigger bit. This enabled bit may be used to avoid forwarding of results from a cryptographic operation. A resource tag corresponding to the instruction stored in the entry may be also held in the instruction status field 728.

In one embodiment, pick queue 700 may be implemented as a unified queue. As stated earlier, a processor core 100 comprising a pick queue 700 may be configured to perform dynamic multithreading. It may not be desirable to instantiate on-chip a separate pick queue 700 for each thread due to on-chip real estate constraints. Also, a single pick queue 700 divided evenly among the maximum number of supported threads, wherein the subdivisions incorporate static allocation, may be inefficient.

For example, if processor core 100 is configured to concurrently execute 8 threads and pick queue 700 has 40 total entries (or 40 entries 712, 40 entries 732, and 40 entries 742), then, in one embodiment, 5 pick queue entries support each thread. Alternatively, a separate 5-entry pick queue may exist for each thread. However, each of the 5 entries in these examples for a particular thread may not be fully utilized or may not be utilized at all, as the particular thread may not be scheduled with work. Another thread, on the other hand, may be utilizing all 5 of its pick queue entries and may need more in order to not experience stalls. Therefore, it may be more efficient and provide higher performance to use dynamic allocation of a unified pick queue 700. In one embodiment, a design tradeoff with dynamic allocation of pick queue entries is the entries do not provide an indication of an ordering among the instructions.

The purpose of maintaining dataflow ordering among the instructions stored in the pick queue 700 is to observe when results are generated and identify instructions that are ready for execution. In one embodiment, content addressable memories (CAMs) may be used within the pick queue to maintain dataflow ordering. The result tags, which may simply be a physical register number, of older (in the pipeline) instructions that have completed execution are broadcasted on a set of result buses, one for each functional unit with a writeback port. Each set of result buses may be connected to comparators, such as xnor gates, at each entry within the pick queue. These comparators allow instructions to determine if their sources match the results being generated. When all of an instruction's sources are ready, the instruction as a whole is considered ready. However, CAMs consume an appreciable amount of both on-chip real estate and electrical power.

In another embodiment, rather than use CAMs to broadcast results, a dependency matrix 740 such as that shown in FIG. 11 may be used. A dependency matrix 740 has one row and one column for every instruction in the pick queue 700. Each cell may hold one bit of state representing whether an instruction assigned to a particular row, or entry 742, is waiting on a dependency from an instruction assigned to a particular column. The bit vectors stored in rows 742 may be set via allocation comparators, which may place a logical high value in the row if the corresponding column produces a corresponding result tag. In one embodiment, as older (in the pipeline) instructions are deallocated from the pick queue 700, a corresponding column is cleared (i.e., set all bits in the column to a logic low value).

The deallocation of speculative instructions, such as load and store instructions, and dependent instructions of the speculative instructions may be handled differently from other instructions. For example, each store operation within processor core 100 may be considered to be a speculative operation in the sense that a miss to a data translation lookaside buffer (d-TLB) may arise during execution of the store instruction by the LSU 245. Similarly, each load operation within processor core 100 may be considered to be a speculative operation in the sense that a miss to the d-TLB, a miss to the data cache, or a read-after-write (RAW) data hazard may arise during execution of the instruction by the LSU 245. When a miss or hazard arises during execution of a load or a store instruction, the pick unit 225 may support various levels of replay capability for dependent instructions after the load instruction. The pick unit 225 may undo a predetermined number of instruction pick clock cycles and subsequently replay the dependent instructions. In one embodiment, independent instructions may not be replayed.

Due to load and store instruction speculation, corresponding entries 742 may not be immediately deallocated in the pick queue 700 once an instruction is picked. The picked bit 724 is used to ensure that the corresponding entry 742 is not re-picked between the cycle an instruction is picked and the cycle an instruction is deallocated from the pick queue 700. Younger dependent instructions in the pick queue 700 may not be picked unless the trigger bit 726 of the corresponding older (in program order) instruction is set.

Execution Pipeline—Store Queue

Figure 12:
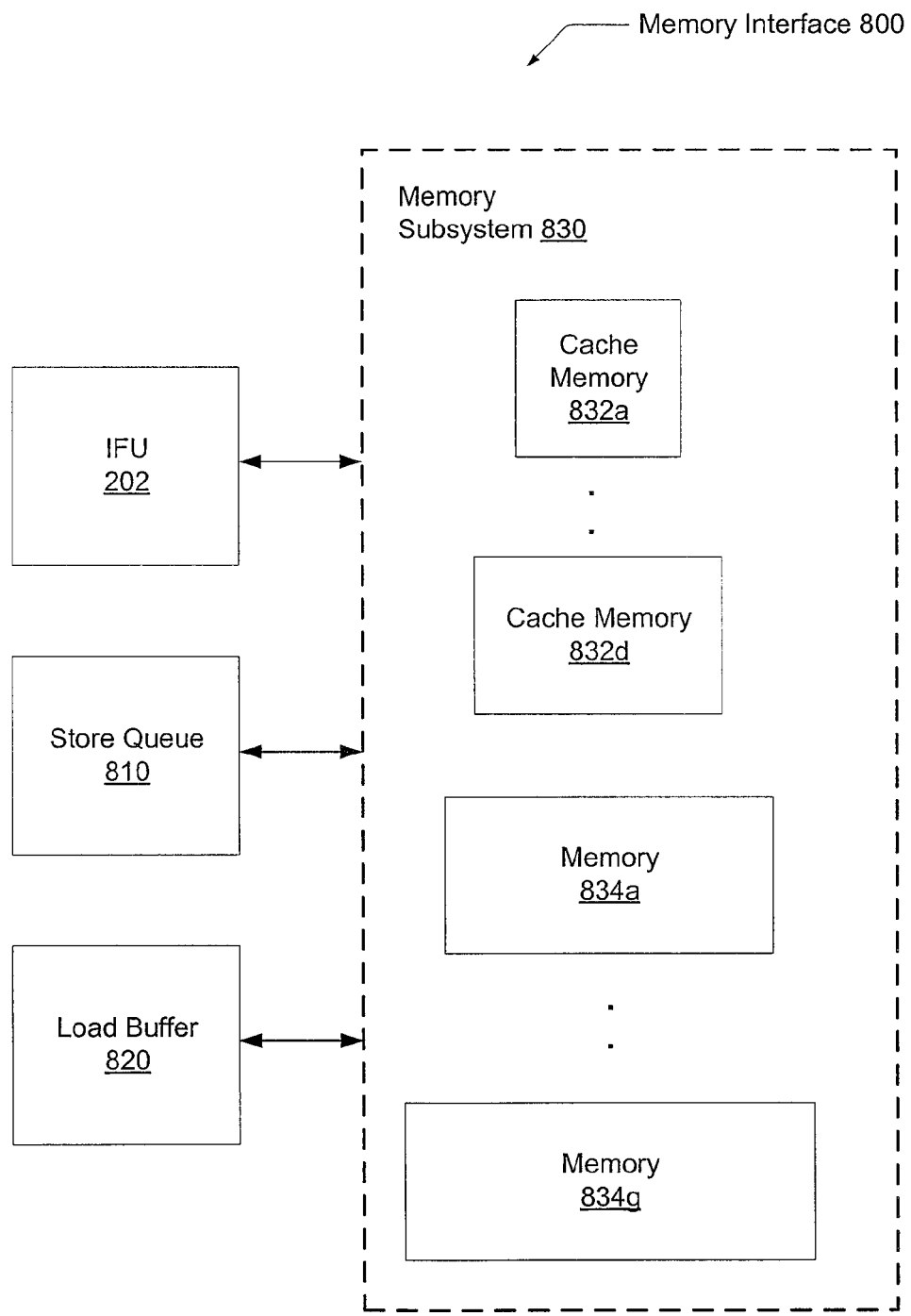
FIG. 12 is a generalized block diagram illustrating one embodiment of a memory interface.

Referring now to FIG. 12, one embodiment of a memory interface 800 illustrating different sources of memory requests is shown. It is noted the components shown in FIG. 12 illustrate a general organization and coupling of components, rather than an actual physical placement of the components. In one embodiment, a memory subsystem 830 comprises one or more levels of caches 832 that may correspond to L1 through L3 caches of a computing system. In addition, the memory subsystem 830 may comprise off-chip memories 834 such as DRAM and a hard disk. Each memory 832 and 834 within memory subsystem 830 may be larger than a previous level of memory in the hierarchy. Each memory 832 and 834 may contain all of the cache lines of a previous level, although the data may be stale relative to the stored contents of a previous level. When a miss occurs for a memory request at a certain level of the memory hierarchy, such as cache memory 832a, then a request may be conveyed to a next level of the hierarchy, such as a cache memory 832b (not shown).

Memory requests may originate at least from the IFU 202, a store queue 810, and a load buffer 820. As described above, IFU 202 may be configured to select a thread to be fetched, to fetch instructions from i-cache 205, which may correspond to cache memory 832a in FIG. 12 unless the L1 cache is not a unified instruction and data cache, for the selected thread, and to request data from L2 cache 105, which may correspond to cache memory 832b (not shown) in FIG. 12, in response to instruction cache misses.

Store queue 810 may be configured to convey memory requests to memory subsystem 800 for a chosen thread in order to write-out data of committed store instructions for the chosen thread. Load buffer 820 may be configured to convey memory requests to memory subsystem 800 for a chosen thread in order to read data of load instructions being executed. Therefore, at least these three sources, IFU 202, store queue 810, and load buffer 820 on the processor core 100 compete for access to memory sub system 800.

Figure 13:
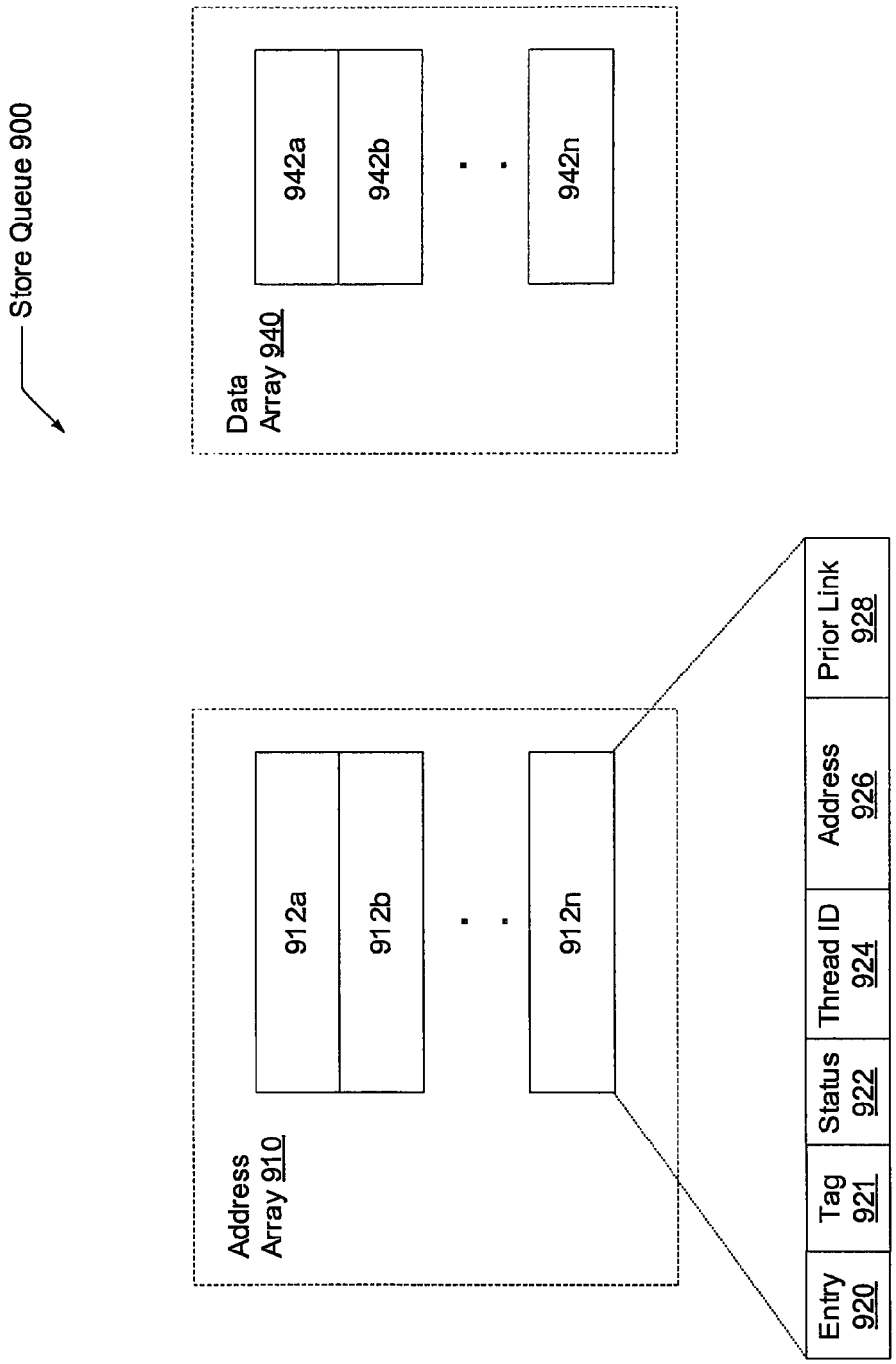
FIG. 13 is a generalized block diagram illustrating one embodiment of a store queue configured to hold committed store instructions.

Turning now to FIG. 13, one embodiment of a store queue 900 configured to hold committed store instructions is shown. In one embodiment, a store queue (SQ) 900 holds all committed store instructions or operations of all threads in processor core 100. The buffered store operations may also be micro-operations, or micro-ops, if core 100 is configured to divide instructions into two or more operations. The store queue 900 may have two main components, such as the address array 910 and the data array 940.

The address array 910 may be used for read-after-write (RAW) hazard checking as all load instructions, or operations, may need to check the store queue 900 for RAW hazards prior to being issued. The data array 940 holds the data of committed store instructions until these instructions write-out data to memory subsystem 300 and the corresponding data of the store instruction are now globally visible to all processors and threads within a computing system. A single entry of the store queue 900 may comprise corresponding entries in each of address array 910 and data array 940. For example, a first entry in the store queue 900 may comprise entries 912a and 942a. A second entry in the store queue 900 may comprise entries 912b and 942b, and so forth. For a particular load instruction, when a RAW hazard is detected in the store queue for a particular entry, which has valid data, bypass may occur immediately.

The address array 910 comprises a plurality of entries 912, wherein each entry 912 corresponds to a store instruction, and includes, in one embodiment, an entry number 920, a store queue tag 921, status information 922, a thread identification (TID) number 924, an address 926, and a prior link pointer value 928. Although the fields are shown in this particular order, other combinations are possible and contemplated. Also, additional fields may be utilized. In some embodiments, the bits storing information for the fields 920-928 may be contiguous. In other embodiments, the bits storing information for the fields 920-928 may not be contiguous. Similarly, the arrangement of address array 910 and data array 940 may use other placements for better design trade-offs. The entry number 920 corresponds to the position of an entry in the store queue 900, wherein entry 0 may be configured to be at the top of address array 910 or at the bottom depending on logic preferences. The entry field 920 may be implied rather than an actual stored number. A resource tag, or store queue tag 921, corresponding to a single store instruction in the processor core 100 pipeline may be also held per entry in address array 910.

Status information 922 may comprise one or more valid bits and cache line MESI protocol information associated with corresponding data stored in the data array 940. A thread identifier (TID) 924 may be used to identify a corresponding thread for a particular store operation when store queue 900 is located within a processor core 100 configured to concurrently execute multiple threads.

In one embodiment, the address field 926 may hold a physical address and a byte mask. Entries may be written in a pipeline stage after address translation completes. Load instructions may initiate a content-addressable-memory (CAM) comparison operation, typically implemented via dynamic circuit logic, in order to check for an address overlap. In one embodiment, an address overlap occurs when the address 926 matches, the thread ID 924 matches, and any bit in the load mask has a match in the store mask. For entries with address overlap, the CAM will also check for full or partial matches. A full match occurs when each bit in the load mask has a corresponding bit in the store mask. Otherwise, the match is partial.

The prior link field 928 may utilize a linked list method to maintain ordering of store instructions within a thread by being configured to hold a pointer value to the last store queue entry allocated for the corresponding thread. The pointer value stored in prior link 928 may be used when a next store instruction corresponding to the same thread is allocated in the store queue 900. The pointer value buffered in the prior link field 928 points from the current store instruction corresponding to the current entry to an immediate prior store that was previously allocated. In one embodiment, the prior link field 928 includes a valid bit contiguous with a prior link value in order to indicate a valid value for the prior link field 928. Also, such a bit with an invalid value may indicate the corresponding entry is the beginning of a chain, or list, of linked store instructions for a particular thread. In another embodiment, such a valid bit may be stored in the status information field 922.

Table 1 below depicts one example of address array entries 912 of a store queue 900. For simplicity, one embodiment of a 6-entry address array 910 is shown. In the example, the following store instructions S0, S1, and S2 are in program order, wherein "S" denotes a store queue tag value for a corresponding store instruction. The resource tags, or store queue tags, may be assigned in an instruction retirement pipeline stage. In one embodiment, one tag may be sent each cycle. In another embodiment, multiple tags may be assigned and sent each clock cycle. Table 1 below illustrates one embodiment of representing the state of the address array 910 after store instructions, such as S0-S2 of thread 2 in the example, have been committed.

TABLE 1

Store Queue Address Array Entries

| Entry | Instr | Status | TID | Address | Prior Link |
|---|---|---|---|---|---|
| 6 | S2 | | 2 | | 4 |
| 5 | | | | | |
| 4 | S1 | | 2 | | 1 |
| 3 | | | | | |
| 2 | | | | | |
| 1 | S0 | | 2 | | Begin |
| 0 | | | | | |

The address array entries 912 may be dynamically allocated by tag generation logic, wherein any method including a random method of tag generation may be used by one skilled in the art as many known methods are already in use. The execution of the multiple threads within processor core 100 may occur at different rates, and over time the tag allocation may actually appear random. Each entry of the address array 910, depicted in FIG. 13 and described above, also has an example shown in Table 1. Table 1 comprises an entry field, which may be implied rather than actually stored, a store queue tag field, status information, a thread ID (TID), an address, and a prior link pointer value. These fields may correspond to fields 920-928 in the above description regarding FIG. 13. Several fields are left blank for the simplified example in order not to take focus away from the functionality of the prior link field updates and use. A further description of the shown example in Table 1 is provided shortly.

As stated earlier, a processor core 100 comprising a store queue 900 may be configured to perform dynamic multi-threading. It may not be desirable to instantiate on-chip a separate store queue 900 for each thread due to on-chip real estate constraints. Also, a single store queue 900 divided evenly among the maximum number of supported threads, wherein the subdivisions incorporate static allocation, may be inefficient. For example, if processor core 100 is configured to concurrently execute 8 threads and store queue 900 has 64 total entries (or 64 entries 912 and 64 entries 942), then, in one embodiment, 8 store queue entries support each thread. However, the 8 entries in this example for thread 0 may not be fully utilized or may not be utilized at all, as thread 0 may not be scheduled with work. Thread 1, on the other hand, may be utilizing all 8 of its store buffer entries and may need more in order to not experience stalls. Therefore, it may be more efficient and provide higher performance to use dynamic allocation of the store queue entries versus static allocation.

In addition, for the given example, a less number of entries may be used in order to reduce consumption of on-chip real estate, but still provide sufficient performance, such as 64 entries. A reorder buffer (ROB) may have 128 entries, but typically, software applications do not have one quarter of the instructions be memory reference operations such as load and store instructions. However, a cache miss may occur during a write-out of data to memory for a particular thread. Therefore, having a store queue less than the size of a ROB, but also greater than the size of one quarter of the ROB size due to cache misses may be more than sufficient. Simulations may be used to fine-tune the size of the single multi-threaded store queue. A design caveat with dynamic allocation of store queue entries is the entries do not provide an indication of an ordering among the store instructions of a same corresponding thread.

The prior link field 928 may be used to manage the relative ordering of all store instructions, or operations, within each thread in the store queue 900. For in-order write-out of data of committed store instructions within a particular thread, a mechanism may be needed that utilizes pointer values stored in prior link field 928.

Execution Pipeline—dTLB

In one embodiment, the data translation-lookaside-buffer (DTLB) consists of 3 major components, such as a custom CAM array, a data field, and a control block. A custom CAM array may store the tag and data portions of each DTLB entry. The tag portion may store a partition ID[9:0], a context[21:0], a virtual or real address bits[51:13], a bit indicating whether the address is real or virtual, and an encoded version of the page size. The data field may store physical address bits 47:13, parity bits over the tag and data fields, and several control bits (writeable, executable, side-effect, privileged, etc.). Each entry of the CAM and data field may be configured to be allocated in each clock cycle by each of the available N threads supported by core 100. A control block may manage various DTLB operations, and a datapath block routes addresses to and from the CAM. The DTLB may be capable of performing one translation per cycle with a predetermined latency. The DTLB may be fully pipelined, except that any write operation must be followed by one dead cycle to allow for circuit recovery.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A microprocessor comprising:
   a front end pipeline comprising a first shared resource that includes a first plurality of entries, wherein the front end pipeline is configured to concurrently fetch and decode a first plurality of instructions;
   an execution pipeline comprising a second shared resource that includes a second plurality of entries, wherein the execution pipeline is configured to concurrently issue a second plurality of instructions to a plurality of execution units, the second plurality of instructions corresponding to a plurality of threads; and
   a commit pipeline comprising a third shared resource that includes a third plurality of entries, wherein the commit pipeline is configured to commit results of a third plurality of instructions corresponding to the plurality of threads to architectural state;
   wherein one or more entries of each of the first, second, and third shared resources may be allocated for use by any of the plurality of threads each clock cycle;
   wherein the microprocessor further comprises control circuitry configured to allow each active thread of the plurality of threads to allocate at least a predetermined quota of entries of each of the first, second, and third shared resources.

2. The microprocessor as recited in claim 1, wherein the control circuitry is further configured to deallocate each entry allocated to the given thread of the first, second, and third shared resources in response to detecting a predetermined long latency event.

3. The microprocessor as recited in claim 2, wherein the control circuitry is further configured to prevent a given active thread from allocating further entries of each of the first, second, and third shared resources, in response to determining a number of entries allocated by the given thread is greater than a predetermined high watermark value.

4. The microprocessor as recited in claim 3, wherein the control circuitry is further configured to activate and deactivate each of the plurality of threads each clock cycle.

5. The microprocessor as recited in claim 3, wherein any entry of each of the first, second, and third shared resources may be allocated for use in each clock cycle by any of the plurality of threads.

6. The microprocessor as recited in claim 5, wherein the first shared resource includes a unified version of at least one of the following: an indirect branch target array, a branch prediction data array, and a reorder buffer.

7. The microprocessor as recited in claim 5, wherein the second shared resource includes a unified version of at least one of the following: a pick queue, a load queue, and a store queue.

8. The microprocessor as recited in claim 5, wherein the third shared resource includes a unified version of at least one of the following: a reorder buffer and a register file.

9. A method comprising:
fetching concurrently and decoding a first plurality of instructions using a front end pipeline comprising a first shared resource comprising a first plurality of entries;
issuing concurrently a second plurality of instructions corresponding to a plurality of threads to a plurality of execution units using an execution pipeline comprising a second shared resource comprising a second plurality of entries;
committing results of a third plurality of instructions corresponding to the plurality of threads to architectural state using a commit pipeline comprising a third shared resource comprising a third plurality of entries;
wherein one or more entries of each of the first, second, and third shared resources may be allocated for use by any of the plurality of threads each clock cycle; and
allowing each active thread of the plurality of threads to allocate at least a predetermined quota of entries of each of the first, second, and third shared resources.

10. The method as recited in claim 9, wherein the method further comprises deallocating each entry allocated to the given thread of the first, second, and third shared resources in response to detecting a predetermined long latency event.

11. The method as recited in claim 10, further comprising preventing a given active thread from allocating further entries of each of the first, second, and third shared resources, in response to determining a number of entries allocated by the given thread is greater than a predetermined high watermark value.

12. The method as recited in claim 11, further comprising activating and deactivating each of the plurality of threads each clock cycle.

13. The method as recited in claim 11, wherein any entry of each of the first, second, and third shared resources may be allocated for use in each clock cycle by any of the plurality of threads.

14. The method as recited in claim 13, wherein the first shared resource includes a unified version of at least one of the following: an indirect branch target array, a branch prediction data array, and a reorder buffer.

15. The method as recited in claim 13, wherein the second shared resource includes a unified version of at least one of the following: a pick queue, a load queue, and a store queue; and wherein the third shared resource includes a unified version of at least one of the following: a reorder buffer and a register file.

16. A system comprising:
a processor; and
a memory coupled to said processor;
wherein said processor includes:
a front end pipeline comprising a first shared resource that includes a first plurality of entries, wherein the front end pipeline is configured to concurrently fetch and decode a first plurality of instructions;
an execution pipeline comprising a second shared resource that includes a second plurality of entries, wherein the execution pipeline is configured to concurrently issue a second plurality of instructions to a plurality of execution units, the second plurality of instructions corresponding to a plurality of threads; and
a commit pipeline comprising a third shared resource that includes a third plurality of entries, wherein the commit pipeline is configured to commit results of a third plurality of instructions corresponding to the plurality of threads to architectural state;
wherein one or more entries of each of the first, second, and third shared resources may be allocated for use by any of the plurality of threads each clock cycle;
wherein the processor is further configured to allow each active thread of the plurality of threads to allocate at least a predetermined quota of entries of each of the first, second, and third shared resources.

17. The system as recited in claim 16, wherein any entry of each of the first, second, and third shared resources may be allocated for use in each clock cycle by any of the plurality of threads.

* * * * *